(12) United States Patent
Cai

(10) Patent No.: US 10,848,963 B2
(45) Date of Patent: Nov. 24, 2020

(54) DATA TRANSMISSION METHOD AND APPARATUS, AND STORAGE MEDIUM

(71) Applicants: CHINA MOBILE COMMUNICATION LTD., RESEARCH INSTITUTE, Beijing (CN); CHINA MOBILE COMMUNICATIONS CORPORATION, Beijing (CN)

(72) Inventor: Hui Cai, Beijing (CN)

(73) Assignees: China Mobile Communications Co., Ltd Research Institute, Beijing (CN); China Mobile Communications Group Co., Ltd, Beijing (CN)

(*) Notice: Subject to any disclaimer, the term of this patent is extended or adjusted under 35 U.S.C. 154(b) by 0 days.

(21) Appl. No.: 16/307,996

(22) PCT Filed: Jun. 8, 2017

(86) PCT No.: PCT/CN2017/087617
§ 371 (c)(1),
(2) Date: Dec. 7, 2018

(87) PCT Pub. No.: WO2017/211320
PCT Pub. Date: Dec. 14, 2017

(65) Prior Publication Data
US 2019/0261164 A1 Aug. 22, 2019

(30) Foreign Application Priority Data
Jun. 8, 2016 (CN) .......................... 2016 1 0405263

(51) Int. Cl.
*H04W 8/24* (2009.01)
*H04W 76/11* (2018.01)
(Continued)

(52) U.S. Cl.
CPC ........... *H04W 8/24* (2013.01); *H04L 61/1511* (2013.01); *H04W 8/04* (2013.01); *H04W 48/16* (2013.01);
(Continued)

(58) Field of Classification Search
CPC ............................... H04W 8/24; H04W 76/12
(Continued)

(56) References Cited

U.S. PATENT DOCUMENTS

2009/0154408 A1* 6/2009 Jeong ..................... H04W 76/10
370/329
2012/0014332 A1* 1/2012 Smith ................... H04W 16/14
370/329
(Continued)

FOREIGN PATENT DOCUMENTS

CN 101931898 A 12/2010
CN 102056112 A 5/2011
(Continued)

OTHER PUBLICATIONS

International Search Report issued in PCT/CN2017/087617, dated Sep. 11, 2017.
(Continued)

*Primary Examiner* — Peter G Solinsky
(74) *Attorney, Agent, or Firm* — BakerHostetler

(57) ABSTRACT

The present application relates to the technical field of communications, and in particular to a data transmission method and apparatus, and a storage medium, which are used for satisfying constantly diversified service scenario requirements, and improving the service data transmission efficiency. Provided is a data transmission method, including: a first device acquires service related information of a User Equipment (UE), and determines data transmission path information corresponding to the service related infor-
(Continued)

mation of the UE. In the embodiments of the present application, by means of acquiring service related information of a UE, data transmission path information corresponding to the service related information of the UE is determined. The mode of selecting a transmission scheme based on actual requirements for service transmission may satisfy diversified service scenario requirements, and thus improve the service data transmission efficiency.

20 Claims, 14 Drawing Sheets

(51) Int. Cl.

| | | |
|---|---|---|
| *H04L 29/12* | (2006.01) | |
| *H04W 8/04* | (2009.01) | |
| *H04W 60/00* | (2009.01) | |
| *H04W 68/00* | (2009.01) | |
| *H04W 76/12* | (2018.01) | |
| *H04W 48/16* | (2009.01) | |
| *H04W 4/70* | (2018.01) | |

(52) U.S. Cl.
CPC ......... *H04W 60/00* (2013.01); *H04W 68/005* (2013.01); *H04W 76/11* (2018.02); *H04W 76/12* (2018.02); *H04W 4/70* (2018.02)

(58) Field of Classification Search
USPC .......................................................... 370/329
See application file for complete search history.

(56) References Cited

U.S. PATENT DOCUMENTS

| | | | |
|---|---|---|---|
| 2012/0093086 A1 | 4/2012 | Yin et al. | |
| 2013/0077484 A1* | 3/2013 | Zhao ................. | H04W 4/70 370/230 |
| 2013/0080597 A1 | 3/2013 | Liao | |
| 2014/0016614 A1 | 1/2014 | Velev et al. | |
| 2014/0040994 A1 | 2/2014 | Zou | |
| 2014/0242970 A1 | 8/2014 | Yu et al. | |
| 2014/0334418 A1 | 11/2014 | Urie et al. | |
| 2015/0172847 A1 | 6/2015 | Yang et al. | |
| 2016/0127968 A1 | 5/2016 | Velev et al. | |
| 2016/0286376 A1 | 9/2016 | Yu et al. | |
| 2018/0139671 A1 | 5/2018 | Velev et al. | |
| 2019/0082356 A1* | 3/2019 | Ode ................. | H04W 28/18 |

FOREIGN PATENT DOCUMENTS

| | | |
|---|---|---|
| CN | 102387495 A | 3/2012 |
| CN | 102917443 A | 2/2013 |
| CN | 103096291 A | 5/2013 |
| CN | 103391532 A | 11/2013 |
| CN | 103517324 A | 1/2014 |
| CN | 105100046 A | 11/2015 |
| CN | 105636207 A | 6/2016 |
| EP | 2568758 A1 | 3/2013 |
| JP | 2011512715 A | 4/2011 |
| JP | 2014510496 A | 4/2014 |
| JP | 2015508583 A | 3/2015 |
| JP | 2016077009 A | 5/2016 |

OTHER PUBLICATIONS

English translation of Written Opinion issued in PCT/CN2017/087617, dated Sep. 11, 2017.
Extended Search Report issued in European Application No. 17809759.8, dated Feb. 5, 2019.

* cited by examiner

DATA TRANSMISSION METHOD AND APPARATUS, AND STORAGE MEDIUM

CROSS-REFERENCE TO RELATED APPLICATIONS

The present disclosure is a National Stage of International Patent Application No. PCT/CN2017/087617, filed on Jun. 8, 2017, and claims benefit of Chinese Patent Application No. 201610405263.X, filed on Jun. 8, 2016, the contents of which are hereby incorporated by reference in their entirety.

TECHNICAL FIELD

The present disclosure relates to the technical field of communications, and in particular to a method and apparatus for transmitting data and a storage medium.

BACKGROUND

Currently, when User Equipment (UE) does not need to transmit any service data, it is in an idle state. The Idle state facilitates the power saving of the UE, and also avoids frequent initiation of a handover process to a network side when the UE moves, thereby increasing the signaling processing load at the network side.

When a third-party server needs to send a downlink data packet to the UE, a data connection is established based on the following process.

As illustrated in FIG. 1, the third-party server sends a downlink data packet sent to the UE in the Idle state to a Public Data Network (PDN) Gate Way (PGW), the PGW sends the downlink data packet to a Serving Gate Way (SGW), and the SGW caches the downlink data packet. The SGW sends a downlink data notification message to a Mobility Management Entity (MME). At this time, if the SGW receives another downlink data packet of the UE, the SGW caches these data packets, but does not send a new downlink data notification message. The MME sends a paging message to a base station (eNodeB) of a tracking area registered by each UE. The eNodeB pages the UE. The UE triggers a service request process, and establishes a connection with the network side. So far, an S1-U downlink data channel between the SGW and the base station is established.

In the above process, the SGW, the MME and the base station are required to negotiate to establish a data channel. If downlink data arrives frequently at intervals, the data channel needs to be negotiated frequently. In addition, the SGW needs to have the capability of caching downlink data until the data channel between the SGW and the base station is established. It is apparent that this mode increases the signaling load and data processing burden at the network side.

In order to alleviate the signaling load and data processing burden at the network side, for terminals based on weak mobile requirements, especially for some terminals without mobility requirements (such as electronic report users), a 3rd Generation Partnership Project (3GPP) proposed a Narrow Band Internet of Things (NB-IOT) solution. This solution proposes two transmission schemes. As illustrated in FIG. 2, one transmission scheme is a control plane scheme (also called a control plane optimization scheme): under this scheme, there is no need to establish an S1-U bearer, and a downlink small data packet is transmitted to an MME through a Non-Access Stratum (NAS) signaling in a channel associated manner and then sent to a UE, that is, a transmission path of the downlink data packet is third-party server→PGW→SGW→MME→base station→UE. Correspondingly, the transmission path of an uplink data packet under the control plane scheme is UE→base station→MME→SGW→PGW→third-party server. The other transmission scheme is a user plane scheme. This transmission scheme needs to establish an S1-U bearer. A transmission path of a downlink data packet is third-party server→PGW→SGW→base station→UE, and a transmission path of an uplink data packet is UE→base station→SGW→PGW→third-party server. The SGW/PGW belongs to a user plane network element, the MME belongs to a control plane network element, and the base station belongs to an access network element. In the above solution, the control plane scheme is suitable for the case where a small data packet is transmitted, and the user plane scheme is suitable for the scenario where the data packet is large and the transmission time interval is long.

Currently, for a specific private network, the NB-IOT solution will select one of the above two transmission schemes. Because different UEs may have different service transmission requirements under the private network, even if the service transmission requirements of the same UE at different times are also different, the mode of selecting a specific transmission scheme for a specific private network in the related art cannot satisfy constantly diversified service scenario requirements.

SUMMARY

According to embodiments of the present disclosure, a method and apparatus for transmitting data, and a storage medium are provided, which are used for satisfying constantly diversified service scenario requirements, and improving the service data transmission efficiency.

An embodiment of the present disclosure provides a method for transmitting data. The method includes the following operations.

A first device acquires service related information of a UE.

Data transmission path information corresponding to the service related information of the UE is determined.

Another embodiment of the present disclosure provides a method for transmitting data. The method includes the following operations.

An instruction network element determines data connection establishment instruction information, the data connection establishment instruction information being used to instruct a first device to determine, for a UE, data transmission path information corresponding to service related information of the UE.

The data connection establishment instruction information is sent to the first device.

Another embodiment of the present disclosure provides a method for transmitting data. The method includes the following operations.

A first control plane functional entity receives data connection establishment instruction information from the instruction network element.

The first control plane functional entity sends the data connection establishment instruction information to a second control plane functional entity, so that the second control plane functional entity determines, for a UE, data transmission path information corresponding to service related information of the UE.

Another embodiment of the present disclosure provides a method for transmitting data. The method includes the following operations.

A second user plane network element receives data connection establishment instruction information from an instruction network element.

The data connection establishment instruction information is sent to a control plane network element, so that the control plane network element determines data transmission path information corresponding to service related information of a UE. Or, the data connection establishment instruction information is sent to a second control plane functional entity through a first control plane functional entity, so that the second control plane functional entity determines data transmission path information corresponding to service related information of the UE.

Yet another embodiment of the present disclosure provides a method for transmitting data. The method includes the following operations.

A first control plane functional entity receives an access request initiated by a UE.

The first control plane functional entity sends the access request to a second control plane functional entity, so that the second control plane functional entity determines, for the UE, data transmission path information corresponding to service related information of the UE.

Yet another embodiment of the present disclosure provides a method for transmitting data. The method includes the following operations.

A UE determines an access request, the access request including at least one of UE identification information or service related information of the UE.

The UE initiates the access request to a first device, so that the first device determines, for the UE, data transmission path information corresponding to the service related information of the UE.

Yet another embodiment of the present disclosure provides a method for transmitting data. The method includes the following operations.

A second device determines registration request information, the registration request information including UE identification information and second device identification information, the second device being a control plane network element, a first control plane functional entity or a second control plane functional entity.

The registration request information is sent to a first device, so that the first device stores a correspondence between the UE identification information and the second device identification information, and determines the second device providing data connection service for the UE based on the correspondence.

Yet another embodiment of the present disclosure provides a method for transmitting data. The method includes the following operations.

A first device receives registration request information sent by a second device, the second device being a control plane network element, a first control plane functional entity or a second control plane functional entity.

A correspondence between UE identification information and second device identification information is stored.

When it is determined to establish a data connection for a UE, the second device providing data connection service for the UE is determined based on the correspondence.

An embodiment of the present disclosure provides an apparatus for transmitting data. The apparatus includes an acquisition module and a determination module.

The acquisition module is configured to acquire service related information of a UE.

The determination module is configured to determine data transmission path information corresponding to the service related information of the UE.

Another embodiment of the present disclosure provides an apparatus for transmitting data. The apparatus includes a determination module and a sending module.

The determination module is configured to determine data connection establishment instruction information, the data connection establishment instruction information being used to instruct a first device to determine, for a UE, data transmission path information corresponding to service related information of the UE.

The sending module is configured to send the data connection establishment instruction information to the first device.

Another embodiment of the present disclosure provides an apparatus for transmitting data. The apparatus includes a receiving module and a sending module.

The receiving module is configured to receive data connection establishment instruction information from an instruction network element.

The sending module is configured to send the data connection establishment instruction information to a second control plane functional entity, so that the second control plane functional entity determines, for a UE, data transmission path information corresponding to service related information of the UE.

Another embodiment of the present disclosure provides an apparatus for transmitting data. The apparatus includes a receiving module and a sending module.

The receiving module is configured to receive data connection establishment instruction information from an instruction network element.

The sending module is configured to: send the data connection establishment instruction information to a control plane network element, so that the control plane network element determines data transmission path information corresponding to service related information of a UE; or, send the data connection establishment instruction information to a second control plane functional entity through a first control plane functional entity, so that the second control plane functional entity determines data transmission path information corresponding to service related information of the UE.

Yet another embodiment of the present disclosure provides an apparatus for transmitting data. The apparatus includes a receiving module and a sending module.

The receiving module is configured to receive an access request initiated by a UE.

The sending module is configured to send the access request to a second control plane functional entity, so that the second control plane functional entity determines, for the UE, data transmission path information corresponding to service related information of the UE.

Yet another embodiment of the present disclosure provides an apparatus for transmitting data. The apparatus includes a determination module and a sending module.

The determination module is configured to determine an access request, the access request including at least one of UE identification information or service related information of a UE.

The sending module is configured to initiate the access request to a first device, so that the first device determines, for a UE, data transmission path information corresponding to the service related information of the UE.

Yet another embodiment of the present disclosure provides an apparatus for transmitting data. The apparatus includes a determination module and a sending module.

The determination module is configured to determine registration request information, the registration request information including UE identification information and second device identification information, the second device being a control plane network element, a first control plane functional entity or a second control plane functional entity.

The sending module is configured to send the registration request information to a first device, so that a first device stores a correspondence between the UE identification information and the second device identification information and determines the second device providing data connection service for the UE based on the correspondence.

Yet another embodiment of the present disclosure provides an apparatus for transmitting data. The apparatus includes a receiving module, a storage module and a data connection establishment module.

The receiving module is configured to receive registration request information sent by a second device, the second device being a control plane network element, a first control plane functional entity or a second control plane functional entity.

The storage module is configured to store a correspondence between UE identification information and second device identification information.

The data connection establishment module is configured to determine, when it is determined to establish a data connection for a UE, the second device providing data connection service for the UE based on the correspondence.

Yet another embodiment of the present disclosure provides an apparatus for transmitting data. The apparatus includes: a processor and a memory configured to store a computer program runnable on the processor.

The processor runs the computer program to perform the operations of the method according to any one of the foregoing contents.

Yet another embodiment of the present disclosure provides a storage medium, having a computer program stored thereon, wherein the computer program is executed by a processor to implement the operations of the method according to any one of the foregoing contents.

According to the embodiments of the present disclosure, service related information of a UE is acquired, and data transmission path information corresponding to the service related information of the UE is determined. In this way, a transmission scheme can be selected based on actual requirements for service transmission, which may satisfy diversified service scenario requirements, thereby improving the service data transmission efficiency.

DETAILED DESCRIPTION

According to the embodiments of the present disclosure, service related information of a UE is acquired, and data transmission path information corresponding to the service related information of the UE is determined. In this way, a transmission scheme is selected based on actual requirements for service transmission, which may satisfy diversified service scenario requirements, thereby improving the service data transmission efficiency.

The embodiments of the present disclosure are further described in detail below with reference to the accompanying drawings.

First Embodiment

Figure 1:
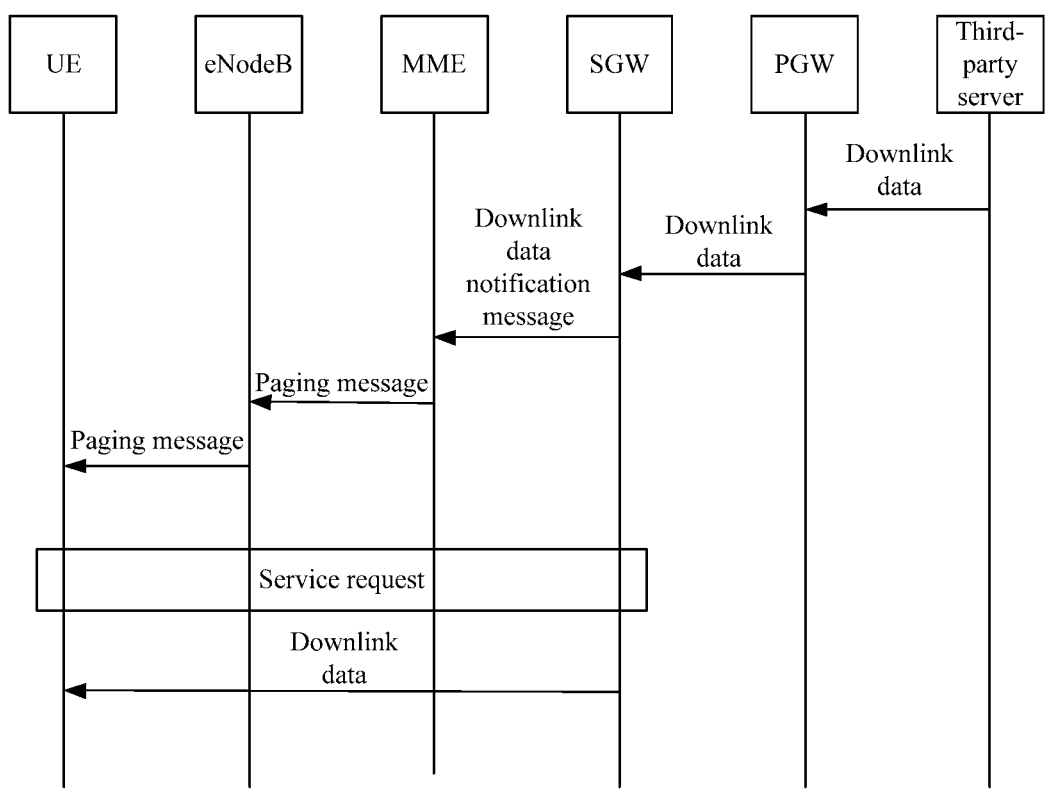
FIG. 1 is a flowchart of establishing a data link by a UE in an Idle state in the related art.
Figure 2:
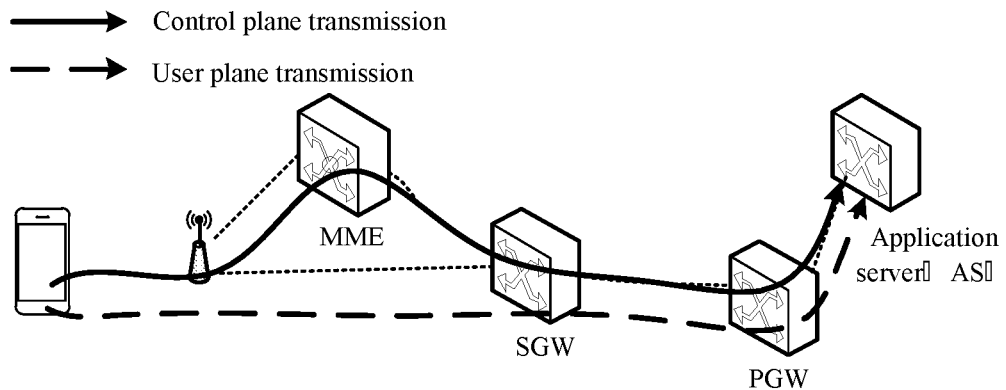
FIG. 2 is a schematic diagram of an NB-IOT solution.
Figure 3:
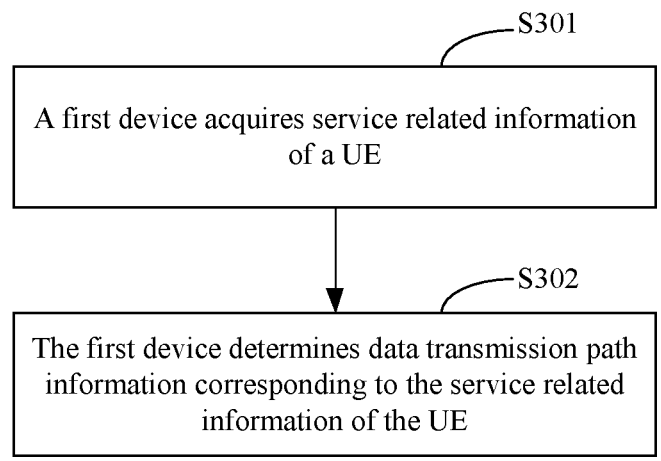
FIG. 3 is a flowchart of a method for transmitting data according to a first embodiment of the present disclosure.

As illustrated in FIG. 3, a flowchart of a method for transmitting data according to a first embodiment of the present disclosure is illustrated. The method includes the following operations.

At S301, a first device acquires service related information of a UE.

The first device in the embodiment of the present disclosure refers to an apparatus having a path selection function at a network side. The first device may be any one of the following network elements:

a third-party server, a capability open platform, a Domain Name System (DNS), a database, an independent network element having a path selection function at a network side, a control plane network element, a second control plane functional entity, a second user plane network element or an access network element. The control plane has a first control plane functional entity and a second control plane functional entity, the first control plane functional entity managing the mobility context of the UE, and the second control plane functional entity managing the session context of the UE.

The database in the embodiment of the present disclosure may be a Home Subscriber Server (HSS), or a policy database, or an independent network element having a data management function at a network side. In the embodiment of the present disclosure, the control plane network element may be a network element having both a Mobility Management (MM) function (used for managing UE mobility, where UE mobility context information may be found through MM) and a Session Management (SM) function (used for managing a user plane data link of a UE, establishing a data connection for the UE, and allocating corresponding resources). The MM function and the SM function may also be carried by two independent network elements respectively, that is, a first control plane functional entity and a second control plane functional entity in the embodiment of the present disclosure.

The above service related information may include one or more of the following information:

service flow description information, third-party identification information, service type information, traffic type information, data length information, UE type information, third-party device type information, service transmission scheme instruction information, UE location information or a third-party server location information. The service transmission scheme instruction information is used to instruct to transmit service data using a user plane scheme or a control plane scheme, the user plane scheme being a scheme for transmitting service data through a user plane and an access network, and the control plane scheme being a scheme for transmitting the service data through the user plane, a control plane and the access network.

The above service flow description information is, for example, an Internet Protocol (IP) quintuple, a Uniform Resource Locator (URL) or a service flow identifier (tag). The third-party identification information includes at least one of third-party service provider identification information (such as an ID of a sponsor of Taobao Mall) or identification information of sub-service provider of a third-party service provider (such as an ID of each merchant service provider in Taobao Mall). The service type may refer to the type of a specific application, such as online banking, Alipay, iQiyi video, or Youku video, and the service type may be indicated by an application ID. The traffic type is a video type, an audio type or the like. The data length information may refer to the size of a data packet. The UE type is a digital electric meter, a digital water meter, or the like. The third-party device type is a video content server, a data acquisition system, or the like. Based on the location information of a UE and/or a third-party server, a user plane network element closest to the location of the UE and/or the third-party server may be selected for the UE.

At S302, the first device determines data transmission path information corresponding to the service related information of the UE.

Here, the data transmission path information may include at least one of service transmission scheme information or information related to a first user plane network element.

The determined service transmission scheme is a user plane scheme or a control plane scheme, the user plane scheme is a scheme for transmitting service data through a user plane and an access network, and the control plane scheme is a scheme for transmitting service data through a user plane, a control plane and an access network.

In a specific implementation, the first device may first acquire subscription information or policy information of a UE from the database, determine, based on the subscription information or the policy information of the UE, whether to establish a data connection for the UE (for example, if the UE does not enable a data connection function, a data connection does not need to be established for the UE), or determine whether to establish a data connection for the UE according to an instruction in an initial attach request initiated by the UE.

After it is determined to establish the data connection for the UE, the foregoing operations of acquiring service related information of the UE and determining data transmission path information corresponding to the service related information are performed, otherwise, a data connection is not established for the UE.

In the embodiment of the present disclosure, the establishment of a data transmission path of a UE may be initiated by an instruction network element (preferably, a third-party server), or may be initiated by the UE. There may be the following modes specifically.

Mode 1: An instruction network element initiates the establishment of a data transmission path for a UE.

As an implementation, the first device is a control plane network element or a second control plane functional entity. At this time, the operation that the first device acquires service related information of a UE includes: the first device receives data connection establishment instruction information sent by an instruction network element, and acquires service related information of the UE according to the data connection establishment instruction information, the data connection establishment instruction information being used to instruct the first device to determine, for the UE, data transmission path information corresponding to the service related information of the UE.

Correspondingly, the instruction network element determines data connection establishment instruction information, the data connection establishment instruction information being used to instruct a first device to determine, for a User Equipment (UE), data transmission path information corresponding to service related information of the UE; and the data connection establishment instruction information is sent to the first device.

In the above implementation, the data connection establishment instruction information may include the service related information of the UE; or, the data connection establishment instruction information may not include the service related information of the UE. At this time, the operation that the first device acquires service related information of the UE according to the data connection establishment instruction information from the instruction network element includes the following operation.

The first device queries the service related information of the UE locally or from a database, a policy server, a DNS server, a third-party server, a capability open platform or an independent network element at a network side, according to the UE identification information in the data connection establishment instruction information.

In the above implementation, the instruction network element is any one of the following:

a third-party server; a capability open platform; a DNS; a database; an independent network element having a path selection function at a network side.

Description of a triggering mode for data connection establishment:

Trigger mode 1: For example, the instruction network element is a third-party server, and the third-party server may trigger the establishment of a data connection for the UE through a control plane:

Case 1: The first device is the control plane network element.

Specifically, the operation of receiving, by the control plane network element, data connection establishment instruction information initiated by a third-party server may include: the control plane network element receives the data connection establishment instruction information sent by the third-party server through the capability open platform. That is, the third-party server sends the data connection establishment instruction information to the control plane network element through the capability open platform. At this time, a transmission path of data connection establishment instruction information is a third-party server→capability open platform→control plane network element.

Case 2: The first device is a second control plane functional entity.

Specifically, the operation that the second control plane functional entity receives the data connection establishment instruction information initiated by an instruction network element may include that:

the second control plane functional entity receives, from the first control plane functional entity, the data connection establishment instruction information sent by the instruction network element, the data connection establishment instruction information from the instruction network element carrying or not carrying the service related information of the UE; or, the second control plane functional entity receives data connection establishment instruction information sent by the first control plane functional entity and service related information of the UE queried by the first control plane functional entity, the data connection establishment instruction information being sent by the instruction network element and not carrying the service related information of the UE.

In a specific implementation, the first control plane functional entity may send the data connection establishment instruction information to a second control plane functional entity after receiving the data connection establishment instruction information initiated by the instruction network element, so that the second control plane functional entity determines, for the UE, data transmission path information corresponding to service related information of the UE. Or, the first control plane functional entity may query service related information of the UE based on UE identification information in the data connection establishment instruction information after receiving the data connection establishment instruction information initiated by the instruction network element, and send the data connection establishment instruction information and the service related information of the UE to a second control plane functional entity.

In the above process, when the instruction network element is a third-party server, the operation that the first control plane functional entity receives data connection establishment instruction information initiated by an instruction network element includes: the first control plane functional entity receives the data connection establishment instruction information sent by the third-party server through the capability open platform.

That is, when the first device is the second control plane functional entity, when the third-party server triggers the establishment of the data connection for the UE through a control plane, the transmission path of the data connection establishment instruction information is a third-party server-→capability open platform→first control plane functional entity→second control plane functional entity.

Trigger mode 2: For example, the instruction network element is a third-party server, and the third-party server may trigger the establishment of a data connection for the UE through a user plane:

Case 1: The first device is the control plane network element.

Specifically, the operation that a first device receives data connection establishment instruction information initiated by an instruction network element includes:

the control plane network element receives, form the second user plane network element, data connection establishment instruction information sent by the instruction network element; here, the instruction network element sends the data connection establishment instruction information to the second user plane network element through a user plane link or a control plane link, and the data connection establishment instruction information from the instruction network element carries or does not carry the service related information of the UE; or, the control plane network element receives data connection establishment instruction information sent by the second user plane network element and the service related information of the UE queried by the second user plane network element. Here, the data connection establishment instruction information is sent by the instruction network element to the second user plane network element. Here, the instruction network element sends the data connection establishment instruction information to the second user plane network element through a user plane link or a control plane link, and the data connection establishment instruction information from the instruction network element does not carry the service related information of the UE.

That is, if the first device is the control plane network element, when the third-party server triggers the establishment of the data connection for the UE through a user plane, the transmission path of the data connection establishment instruction information is a third-party server→capability open platform→second user plane network element→control plane network element. The second user plane network element here may be the same as or different from the first user plane network element in the final determined data transmission path.

Case 2: The first device is a second control plane functional entity.

Specifically, the first control plane functional entity receives, from a second user plane network element, data connection establishment instruction information sent by the instruction network element. Then, the first control plane functional entity may send the data connection establishment instruction information to the second control plane functional entity, so that the second control plane functional entity determines, for a UE, data transmission path information corresponding to service related information of the UE. Or, when the data connection establishment instruction information of the instruction network element does not carry the service related information of the UE, the first control plane functional entity may query service related information of the UE based on UE identification information in the data connection establishment instruction information, and send the data connection establishment instruction information and the service related information of the UE to a second control plane functional entity.

In the above cases, when the third-party server triggers the establishment of the data connection for the UE through a user plane, the transmission path of the data connection establishment instruction information is a third-party server- →capability open platform→second user plane network element→first control plane functional entity→second control plane functional entity.

In summary, in the embodiment of the present disclosure, the control plane network element or the first control plane functional entity may directly receive the data connection establishment instruction information (control plane trigger) sent by the third-party server through the capability open platform, or may receive, form the second user plane network element, the data connection establishment instruction information (user plane trigger) sent by the third-party server.

Mode 2: A UE initiates establishment of a data transmission path.

Specifically, the operation that a first device acquires service related information of a UE includes: a first device receives an access request initiated by a UE, and acquires service related information of the UE based on the access request. The access request is an initial attach request or a service request.

Here, the access request may carry the service related information of the UE; or, the access request does not carry the service related information of the UE.

When the access request does not carry the service related information of the UE, the operation that the service related information of the UE is acquired based on the access request includes: the first device queries the service related information of the UE locally or from a database, a policy server, a DNS server, a third-party server, a capability open platform or an independent network element of a network side according to UE identification information in the access request.

In the above implementation, if the first device is the second control plane functional entity, the operation that the second control plane functional entity receives the access request includes: the second control plane functional entity receives the access request sent by the first control plane functional entity, the access request carrying or not carrying the service related information of the UE. Here, a first control plane functional entity receives an access request initiated by a UE, and sends it to a second control plane functional entity.

Or, the second control plane functional entity receives the access request sent by the first control plane functional entity and service related information of the UE queried by the first control plane functional entity, the access request not carrying the service related information of the UE. Here, a first control plane functional entity queries service related information of a UE based on UE identification information in a received access request, and sends the access request and the service related information of the UE to a second control plane functional entity.

The following contents are applicable to the above modes 1 and 2.

In a specific implementation, if the first device is the control plane network element or the second control plane functional entity, the operation that the first device determines data transmission path information corresponding to the service related information of the UE includes: data transmission path information corresponding to the service related information of the UE is queried locally or from a database, a policy server, a DNS server, a third-party server, a capability open platform or an independent network element having a path selection function at a network side.

As an implementation A, the determined service transmission scheme is a user plane scheme:

if the first device is the control plane network element or the second control plane functional entity, after the first device determines data transmission path information corresponding to the service related information of the UE at S302, the method further includes: the first device sends resource allocation instruction information to a first user plane network element in a determined data transmission path, an access network element the UE has attached, and the UE, the resource allocation instruction information being used to instruct to adopt a user plane scheme, and instruct the first user plane network element, the access network element and the UE to allocate service data transmission resources.

Correspondingly, when data disconnection instruction information sent by an instruction network element is received, the first user plane network element and the access network element the UE has accessed are instructed to release the service data transmission resources allocated for the UE according to the data disconnection instruction information.

As another implementation B, the determined service transmission scheme is a control plane scheme:

if the first device is the control plane network element or the second control plane functional entity, after the first device determines data transmission path information corresponding to the service related information of the UE, the method further includes: the first device sends resource allocation instruction information to a first user plane network element in a determined data transmission path, the resource allocation instruction information being used to instruct to adopt a control plane scheme to transmit service data to the UE, and instruct the first user plane network element to allocate service data transmission resources.

Correspondingly, after data disconnection instruction information sent by an instruction network element is received, the first user plane network element the UE has accessed is instructed to release the service data transmission resources allocated for the UE according to the data disconnection instruction information.

In the above implementations A and B, the resource allocation instruction information further includes service flow description information, used to instruct to store a mapping relationship between the service flow description information and the allocated service data transmission resources, to determine, upon reception of service data to be sent, a service data transmission resource corresponding to the service data to be sent according to service flow description information carried in the service data to be sent.

In the above implementations A and B, the resource allocation instruction information further includes a Quality of Service (QoS) policy, the QoS policy is used to instruct to allocate a service data transmission resource satisfying the QoS policy.

Specifically, the first device acquires the QoS policy according to the following operations:

the first device queries a QoS policy corresponding to the service related information locally or form a database, a policy server, a DNS server, a third-party server, a capability open platform or an independent network element having a path selection function at a network side based on the acquired service related information.

In the first embodiment, if the first device is a third-party server, a capability open platform, a DNS, a database, or an independent network element at a network side instead of a control plane network element or a second control plane functional entity, after the first device determines data transmission path information corresponding to the service related information of the UE, the method further includes:

the determined data transmission path information is sent to the control plane network element or the second control plane functional entity the UE has accessed. In this case, the data transmission path information may include only service transmission scheme information, and does not include first user plane network element information, and the control plane network element or the second control plane functional entity selects the first user plane network element information based on the service transmission scheme.

Further, if the first device is a third-party server, the operation that the third-party server sends the determined data transmission path information to a control plane network element the UE has accessed or a second control plane functional entity includes: the third-party server sends the determined data transmission path information to a control plane network element the UE has accessed or a second control plane functional entity through a capability open platform.

The idea of the present disclosure is further illustrated by several specific examples below.

Second Embodiment (a Third Party Determines to Adopt a User Plane Scheme to Transmit UE Service Data by Control Plane Trigger)

Figure 4:
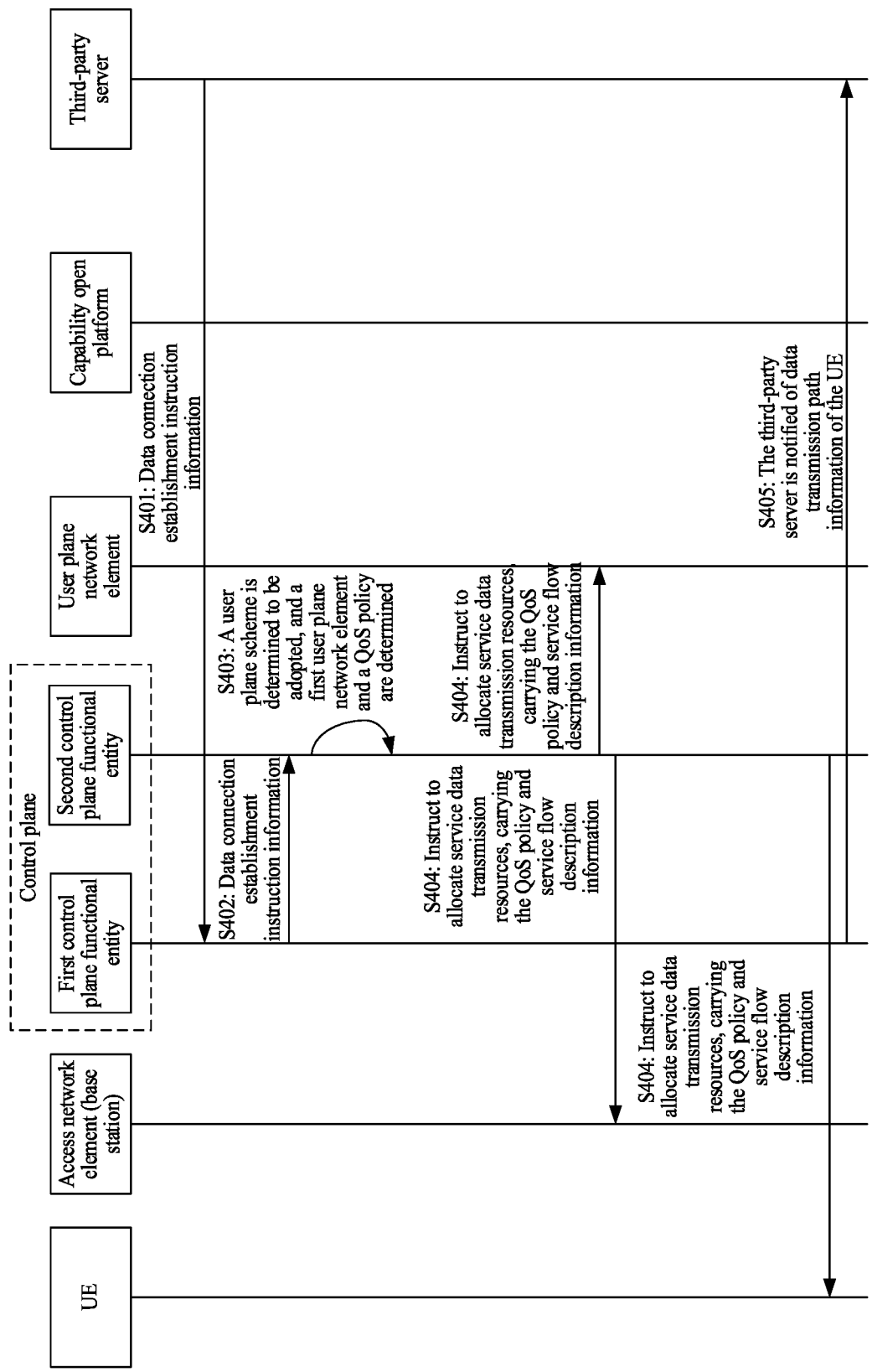
FIG. 4 is a flowchart of a method for transmitting data according to a second embodiment of the present disclosure.

As illustrated in FIG. 4, a flowchart of a method for transmitting data according to a second embodiment of the present disclosure is illustrated. The method includes the following operations.

At S401, a third-party server sends data connection establishment instruction information including service related information of a UE (including service flow description information) to a first control plane functional entity through a capability open platform.

At S402, the first control plane functional entity transmits the data connection establishment instruction information to a second control plane functional entity.

At S403, the second control plane functional entity determines to adopt a user plane scheme based on the service related information of the UE, and determines information related to a first user plane network element accessed by the UE and a QoS policy corresponding to the service related information.

Here, the second control plane functional entity queries a user plane scheme and first user plane network element information corresponding to the service related information of the UE locally or from a database, a policy server, a DNS server, a third-party server, a capability open platform or an independent network element having a path selection function at a network side based on the acquired service related information.

In addition, the second control plane functional entity queries a QoS policy corresponding to the service related information locally or from a database, a policy server, a DNS server, a third-party server, a capability open platform or an independent network element having a path selection function at a network side based on the acquired service related information.

At S404, the second control plane functional entity sends resource allocation instruction information to a first user plane network element in a determined data transmission path, an access network element (base station) attached by the UE, and the UE, the resource allocation instruction information being used to instruct to adopt a user plane scheme, and instruct the first user plane network element, the access network element and the UE to allocate service data transmission resources satisfying the determined QoS policy.

At S405, the second control plane functional entity notifies the third-party server of the data transmission path information of the UE (through the first control plane functional entity).

Here, the resource allocation instruction information includes service flow description information and a QoS policy.

The UE, the access network element attached by the UE and the first user plane network element store a mapping relationship between the service flow description information and the allocated service data transmission resources, in order that when receiving service data to be sent, a service data transmission resource corresponding to the service data to be sent is determined according to service flow description information carried in the service data to be sent.

Next, a downlink service flow is sent to an access network through a user plane.

In some embodiments, the third-party service sends data disconnection instruction information, and the second control plane functional entity instructs the first user plane network element and the access network element accessed by the UE to release the service data transmission resources allocated for the UE according to the data disconnection instruction information.

Third Embodiment (a third party determines to adopt a user plane scheme to transmit UE service data by user plane trigger)

Figure 5:
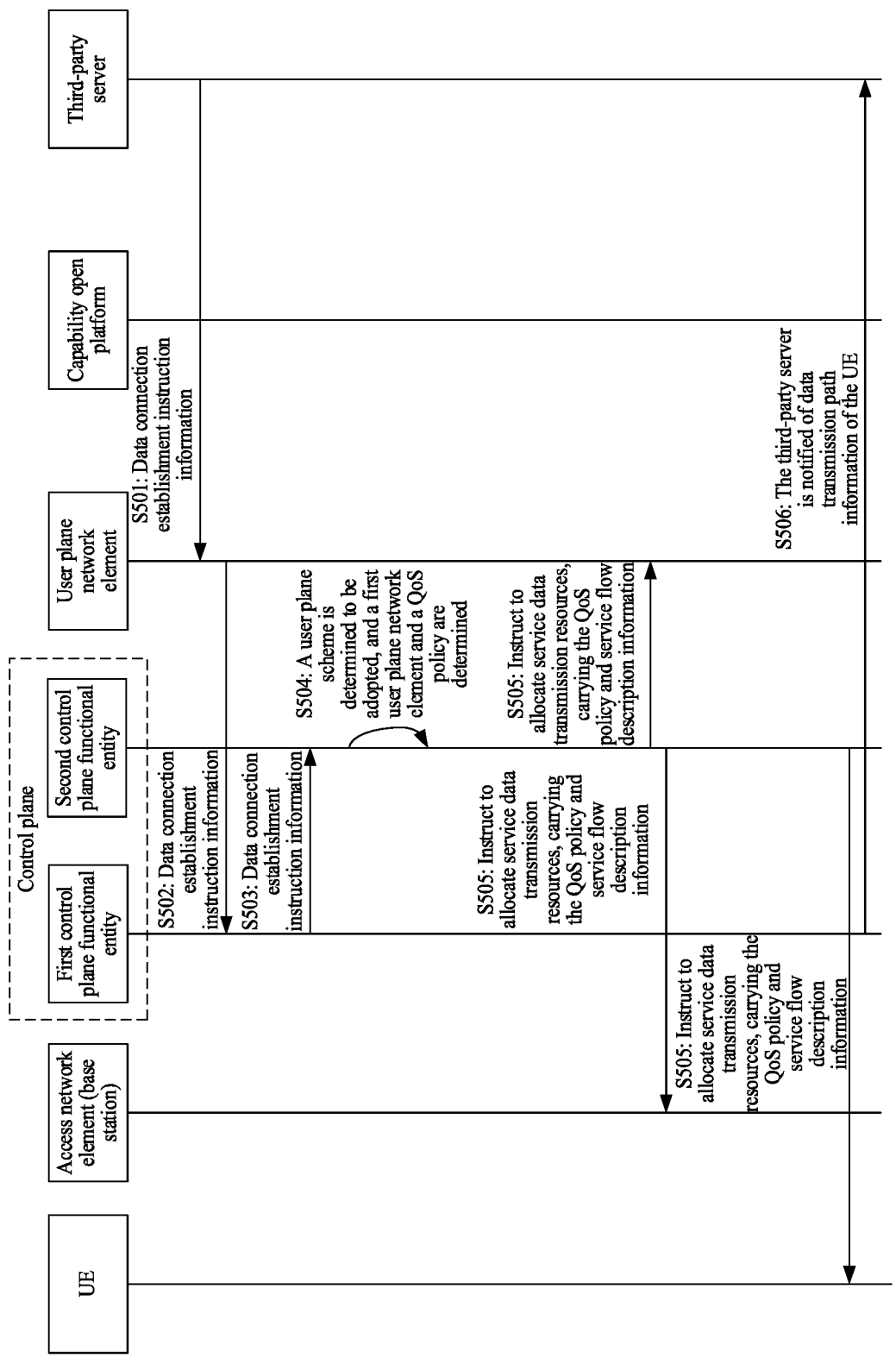
FIG. 5 is a flowchart of a method for transmitting data according to a third embodiment of the present disclosure.

As illustrated in FIG. 5, a flowchart of a method for transmitting data according to a third embodiment of the present disclosure is illustrated. The method includes the following operations.

At S501, a third-party server sends data connection establishment instruction information including service related information of a UE (including service flow description information) to a second user plane network element through a capability open platform.

At S502, the second user plane network element sends the data connection establishment instruction information to a first control plane functional entity.

At S503, the first control plane functional entity transmits the data connection establishment instruction information to a second control plane functional entity.

At S504, the second control plane functional entity determines to adopt a user plane scheme based on the service related information of the UE, and determines information of first user plane network element the UE has accessed and a QoS policy corresponding to the service related information.

Here, the second control plane functional entity queries a user plane scheme and first user plane network element information corresponding to the service related information of the UE locally or from a database, a policy server, a DNS server, a third-party server, a capability open platform or an independent network element having a path selection function at a network side based on the acquired service related information.

In addition, the second control plane functional entity queries a QoS policy corresponding to the service related information locally or from a database, a policy server, a DNS server, a third-party server, a capability open platform or an independent network element having a path selection function at a network side based on the acquired service related information.

At S505, the second control plane functional entity sends resource allocation instruction information to a first user plane network element in a determined data transmission path, an access network element (base station) attached by the UE, and the UE, the resource allocation instruction information being used to instruct to adopt a user plane scheme, and instruct the first user plane network element, the access network element and the UE to allocate service data transmission resources satisfying the determined QoS policy.

At S506, the second control plane functional entity notifies the third-party server of the data transmission path information of the UE (through the first control plane functional entity).

Here, the resource allocation instruction information includes service flow description information and a QoS policy. The UE, the access network element attached by the UE and the first user plane network element store a mapping relationship between the service flow description information and the allocated service data transmission resources, in order that when receiving service data to be sent, a service data transmission resource corresponding to the service data to be sent is determined according to service flow description information carried in the service data to be sent.

Next, a downlink service flow is sent to an access network through a user plane.

In some embodiments, the third-party service sends data disconnection instruction information, and the second control plane functional entity instructs the first user plane network element and the access network element accessed by the UE to release the service data transmission resources allocated for the UE according to the data disconnection instruction information.

Fourth embodiment (a third party determines to adopt a control plane scheme to transmit UE service data by control plane trigger)

Figure 6:
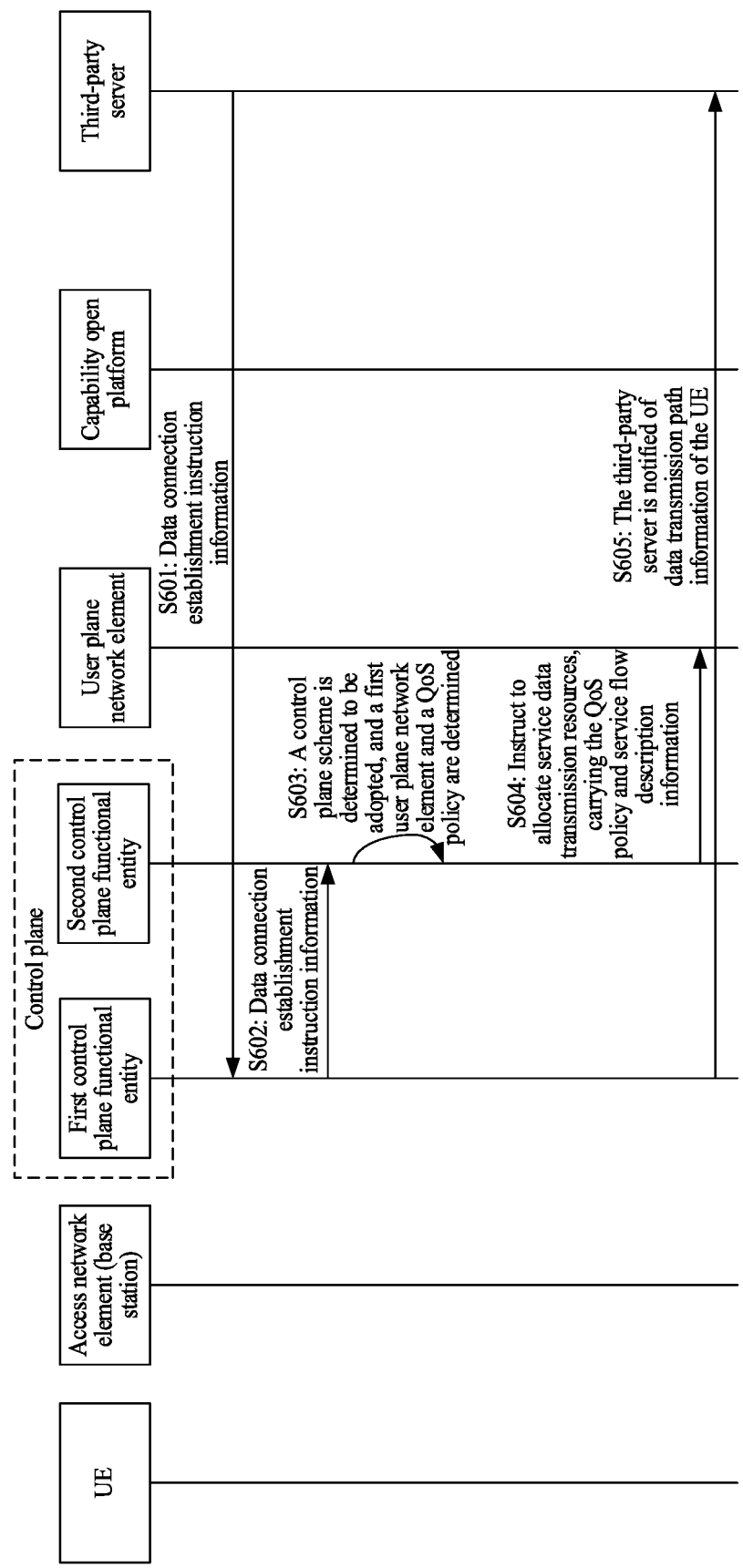
FIG. 6 is a flowchart of a method for transmitting data according to a fourth embodiment of the present disclosure.

As illustrated in FIG. 6, a flowchart of a method for transmitting data according to a fourth embodiment of the present disclosure is illustrated. The method includes the following operations.

At S601, a third-party server sends data connection establishment instruction information including service related information of a UE (including service flow description information) to a first control plane functional entity through a capability open platform.

At S602, the first control plane functional entity transmits the data connection establishment instruction information to a second control plane functional entity.

At S603, the second control plane functional entity determines to adopt a control plane scheme based on the service related information of the UE, and determines information of a first user plane network element the UE has accessed and a QoS policy corresponding to the service related information.

Here, the second control plane functional entity queries a control plane scheme and the information of first user plane network element which are corresponding to the service related information of the UE locally or form a database, a policy server, a DNS server, a third-party server, a capability open platform or an independent network element having a path selection function at a network side based on the acquired service related information.

In addition, the second control plane functional entity queries a QoS policy corresponding to the service related information locally or from a database, a policy server, a DNS server, a third-party server, a capability open platform or an independent network element having a path selection function at a network side based on the acquired service related information.

At S604, the second control plane functional entity sends resource allocation instruction information to a first user plane network element in a determined data transmission path, the resource allocation instruction information being used to instruct to adopt a control plane scheme, and instruct the first user plane network element to allocate service data transmission resources satisfying the determined QoS policy.

At S605, the second control plane functional entity notifies the third-party server of the data transmission path information of the UE (through the first control plane functional entity).

Here, the resource allocation instruction information includes service flow description information and a QoS policy. The first user plane network element stores a mapping relationship between the service flow description information and the allocated service data transmission resources, in order that when receiving service data to be sent, a service data transmission resource corresponding to the service data to be sent is determined according to service flow description information carried in the service data to be sent.

Next, a downlink service flow is sent to a control plane through a user plane.

In some embodiments, the third-party service sends data disconnection instruction information, and the second control plane functional entity instructs the first user plane network element accessed by the UE to release the service data transmission resources allocated for the UE according to the data disconnection instruction information.

Fifth embodiment (a third party determines to adopt a control plane scheme to transmit UE service data by user plane trigger)

Figure 7:
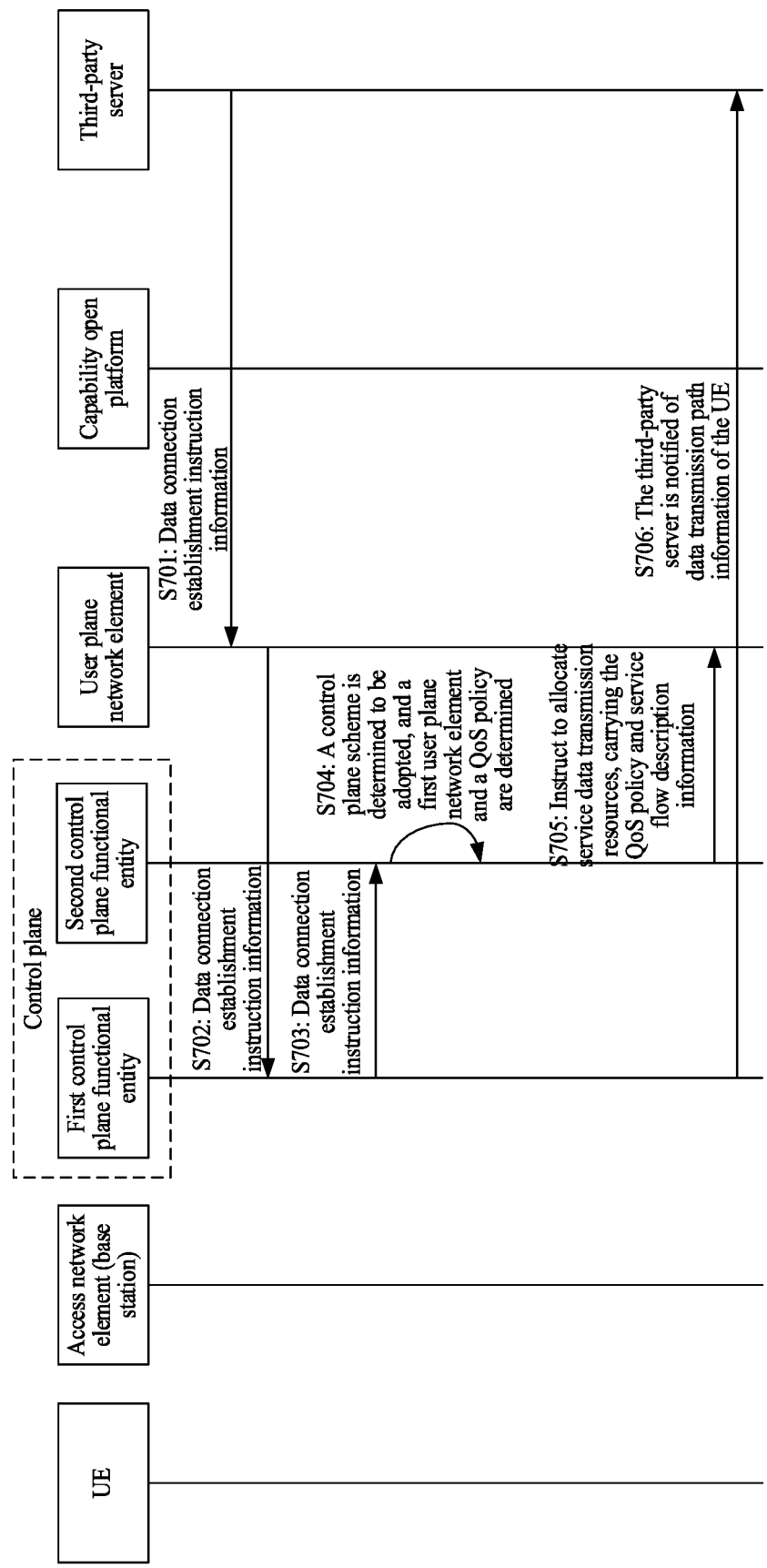
FIG. 7 is a flowchart of a method for transmitting data according to a fifth embodiment of the present disclosure.

As illustrated in FIG. 7, a flowchart of a method for transmitting data according to a fifth embodiment of the present disclosure is illustrated. The method includes following operations.

At S701, a third-party server sends data connection establishment instruction information including service related information of a UE (including service flow description information) to a second user plane network element through a capability open platform.

At S702, the second user plane network element sends the data connection establishment instruction information to a first control plane functional entity.

At S703, the first control plane functional entity transmits the data connection establishment instruction information to a second control plane functional entity.

At S704, the second control plane functional entity determines to adopt a control plane scheme based on the service related information of the UE, and determines information of a first user plane network element the UE has accessed and a QoS policy corresponding to the service related information.

Here, the second control plane functional entity queries a control plane scheme and first user plane network element information corresponding to the service related information of the UE locally or from a database, a policy server, a DNS server, a third-party server, a capability open platform or an independent network element having a path selection function at a network side based on the acquired service related information.

In addition, the second control plane functional entity queries a QoS policy corresponding to the service related information locally or from a database, a policy server, a DNS server, a third-party server, a capability open platform or an independent network element having a path selection function at a network side based on the acquired service related information.

At S705, the second control plane functional entity sends resource allocation instruction information to a first user plane network element in a determined data transmission path, the resource allocation instruction information being used to instruct to adopt a control plane scheme, and instruct the first user plane network element to allocate service data transmission resources satisfying the determined QoS policy.

At S706, the second control plane functional entity notifies the third-party server of the data transmission path information of the UE (through the first control plane functional entity).

Here, the resource allocation instruction information includes service flow description information and a QoS policy. The first user plane network element stores a mapping relationship between the service flow description information and the allocated service data transmission resources, in order that when receiving service data to be sent, a service data transmission resource corresponding to the service data to be sent is determined according to service flow description information carried in the service data to be sent.

Next, a downlink service flow is sent to a control plane through a user plane.

The data transmission method illustrated in FIG. 7 may further include: the third-party service sends data disconnection instruction information, and the second control plane functional entity instructs the first user plane network element the UE has accessed to release the service data transmission resources allocated for the UE according to the data disconnection instruction information.

Sixth embodiment (UE initiated, carrying service related information)

Figure 8:
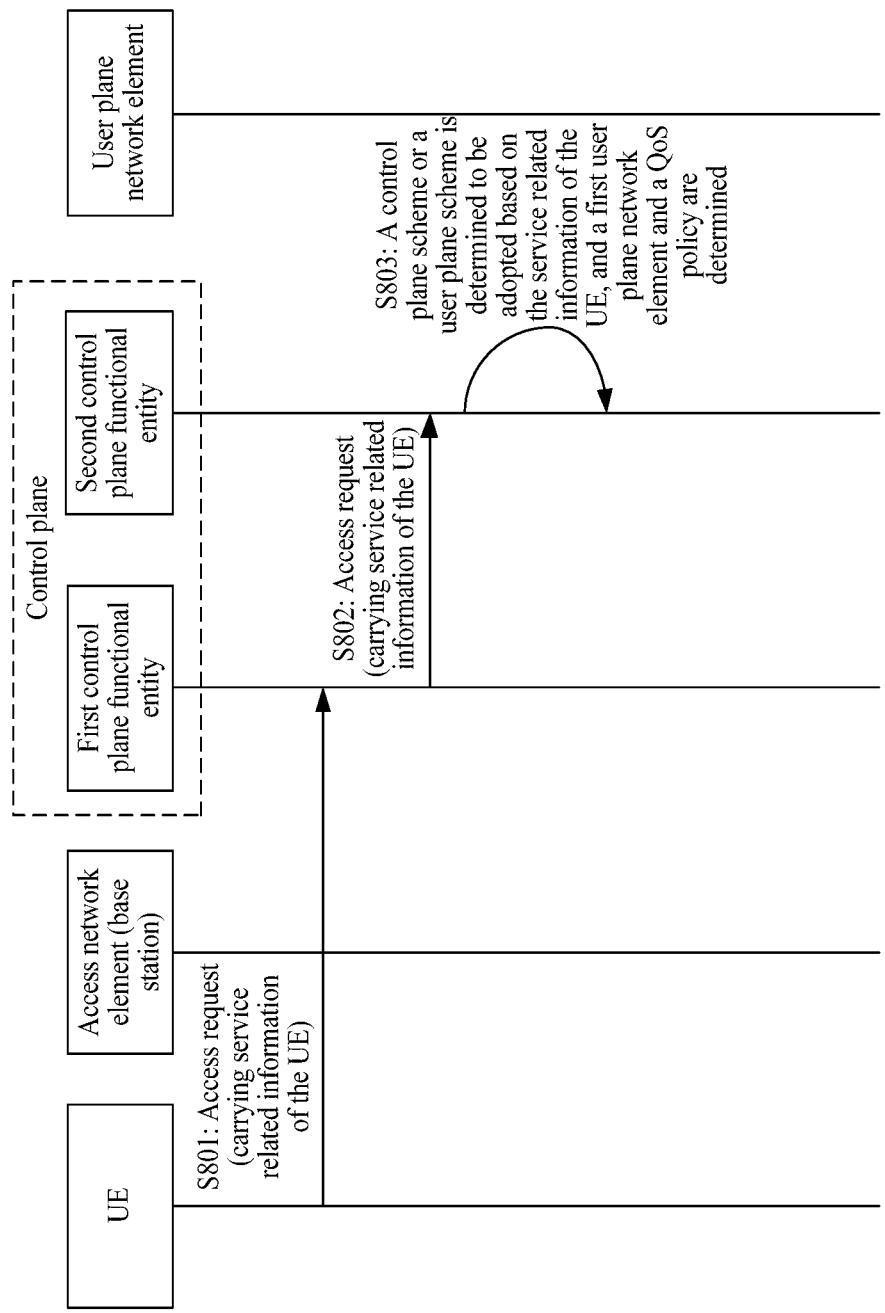
FIG. 8 is a flowchart of a method for transmitting data according to a sixth embodiment of the present disclosure.

As illustrated in FIG. 8, a flowchart of a method for transmitting data according to a sixth embodiment of the present disclosure is illustrated. The method includes the following operations.

At S801, a UE initiates an access request to a first control plane functional entity, the access request carrying service related information of the UE.

At S802, the first control plane functional entity sends the access request to a second control plane functional entity.

At S803, the second control plane functional entity determines to adopt a control plane scheme or a user plane scheme based on the service related information of the UE in the access request, and determines information of a first user plane network element the UE has accessed and a QoS policy corresponding to the service related information.

The subsequent process is described in detail in the second to fifth embodiments.

Seventh embodiment (UE initiated, not carrying service related information)

Figure 9:
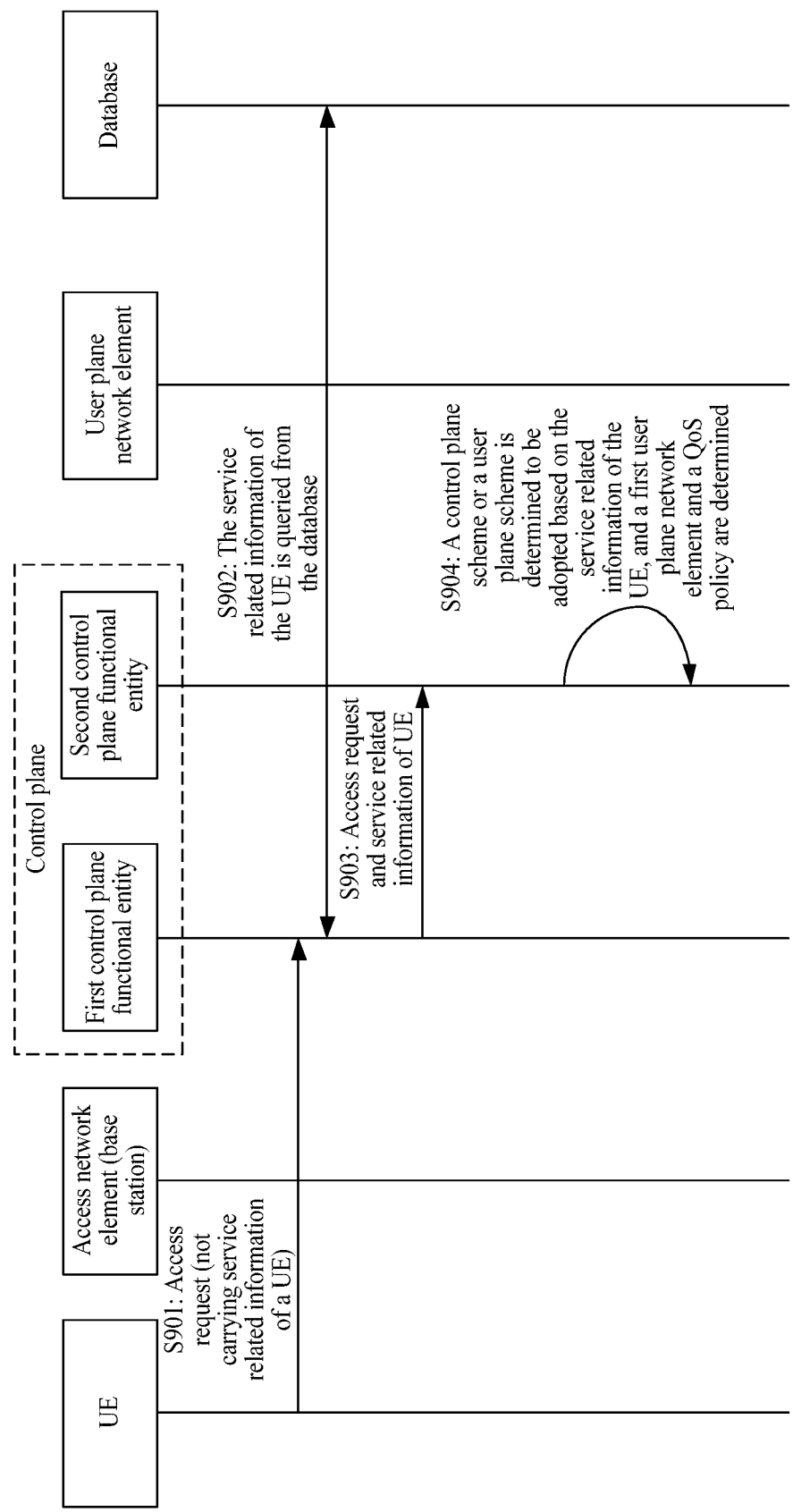
FIG. 9 is a flowchart of a method for transmitting data according to a seventh embodiment of the present disclosure.

As illustrated in FIG. 9, a flowchart of a method for transmitting data according to a seventh embodiment of the present disclosure is illustrated. The method includes the following operations.

At S901, a UE initiates an access request to a first control plane functional entity, the access request not carrying service related information of the UE.

At S902, the first control plane functional entity queries the service related information of the UE from a database based on UE identification information in the access request.

At S903, the first control plane functional entity sends the access request and the service related information of the UE to a second control plane functional entity.

At S904, the second control plane functional entity determines to adopt a control plane scheme or a user plane scheme based on the service related information of the UE, and determines information related to a first user plane network element the UE has accessed and a QoS policy corresponding to the service related information.

The subsequent process is described in detail in the second to fifth embodiments.

Eighth embodiment (UE initiated, carrying service related information)

Figure 10:
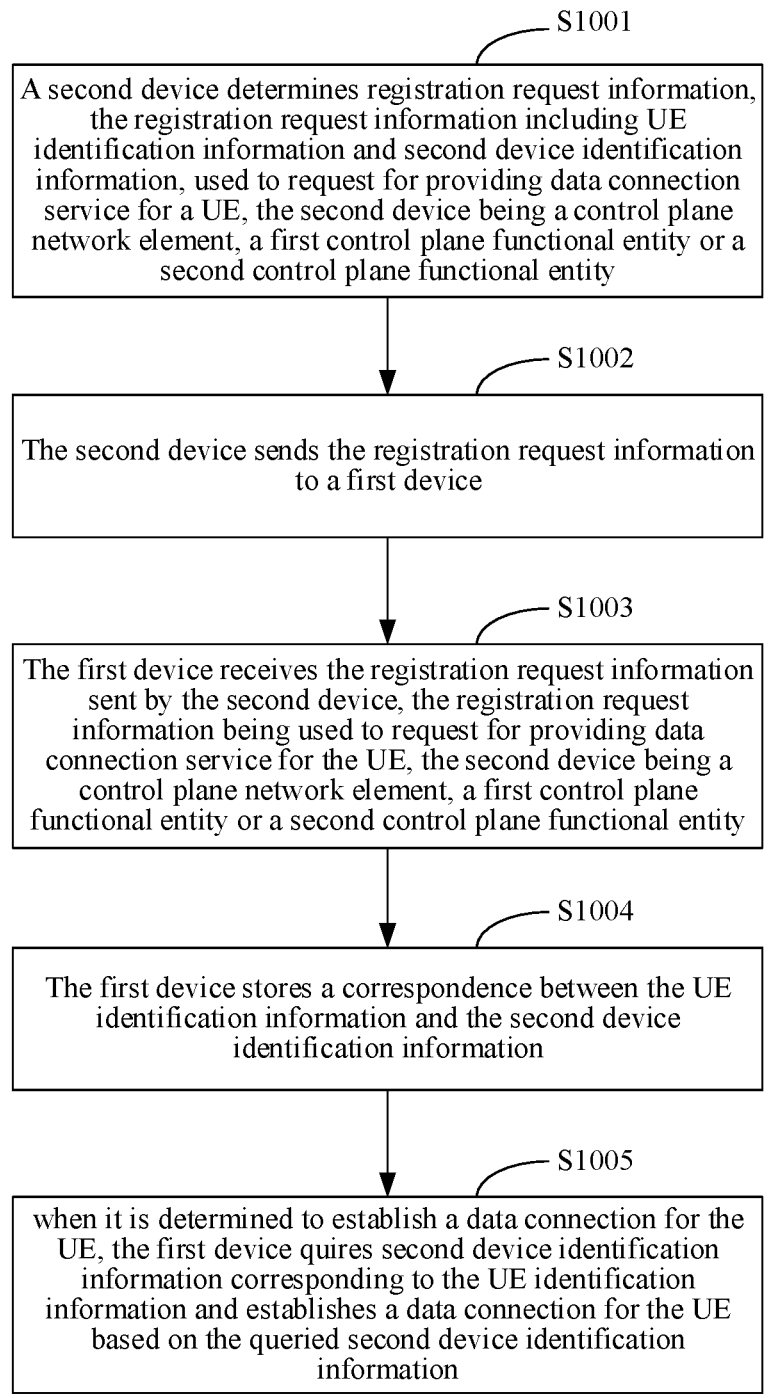
FIG. 10 is a flowchart of a method for transmitting data according to an eighth embodiment of the present disclosure.

As illustrated in FIG. 10, a flowchart of a method for transmitting data according to an eighth embodiment of the present disclosure is illustrated. The method includes the following operations.

At S1001, a second device determines registration request information, the registration request information including UE identification information and second device identification information, used to request for providing data connection service for a UE, the second device being a control plane network element, a first control plane functional entity or a second control plane functional entity.

At S1002, the second device sends the registration request information to a first device (such as a database).

At S1003, the first device receives the registration request information sent by the second device, the second device being a control plane network element, a first control plane functional entity or a second control plane functional entity. The registration request information is used to request for providing data connection service for the UE.

At S1004, the first device stores a correspondence between the UE identification information and the second device identification information.

At S1005, when it is determined to establish a data connection for the UE, the first device determines, based on the correspondence, the second device providing data connection service for the UE.

In a specific implementation, the registration request information sent by the second device may include service related information of the UE. At this time, the second device stores a correspondence between the UE identification information, the service related information and the second device identification information. When it is determined to establish a data connection for the UE, the second device providing data connection service for the UE is determined based on the stored correspondence.

Or, the registration request information does not include service related information of the UE. When it is determined to establish a data connection for the UE, the second device providing data connection service for the UE is determined based on the stored correspondence and the acquired service related information of the UE (which may be acquired from a third-party server).

Based on the same inventive concept, a data transmission apparatus corresponding to the data transmission method is also provided in the embodiment of the present disclosure. Since the principle of solving the problem of the apparatus is similar to that of the data transmission method in the embodiment of the present disclosure, the implementation of the apparatus can be referred to the implementation of the method, and the repetition will not be described.

Ninth Embodiment

Figure 11:
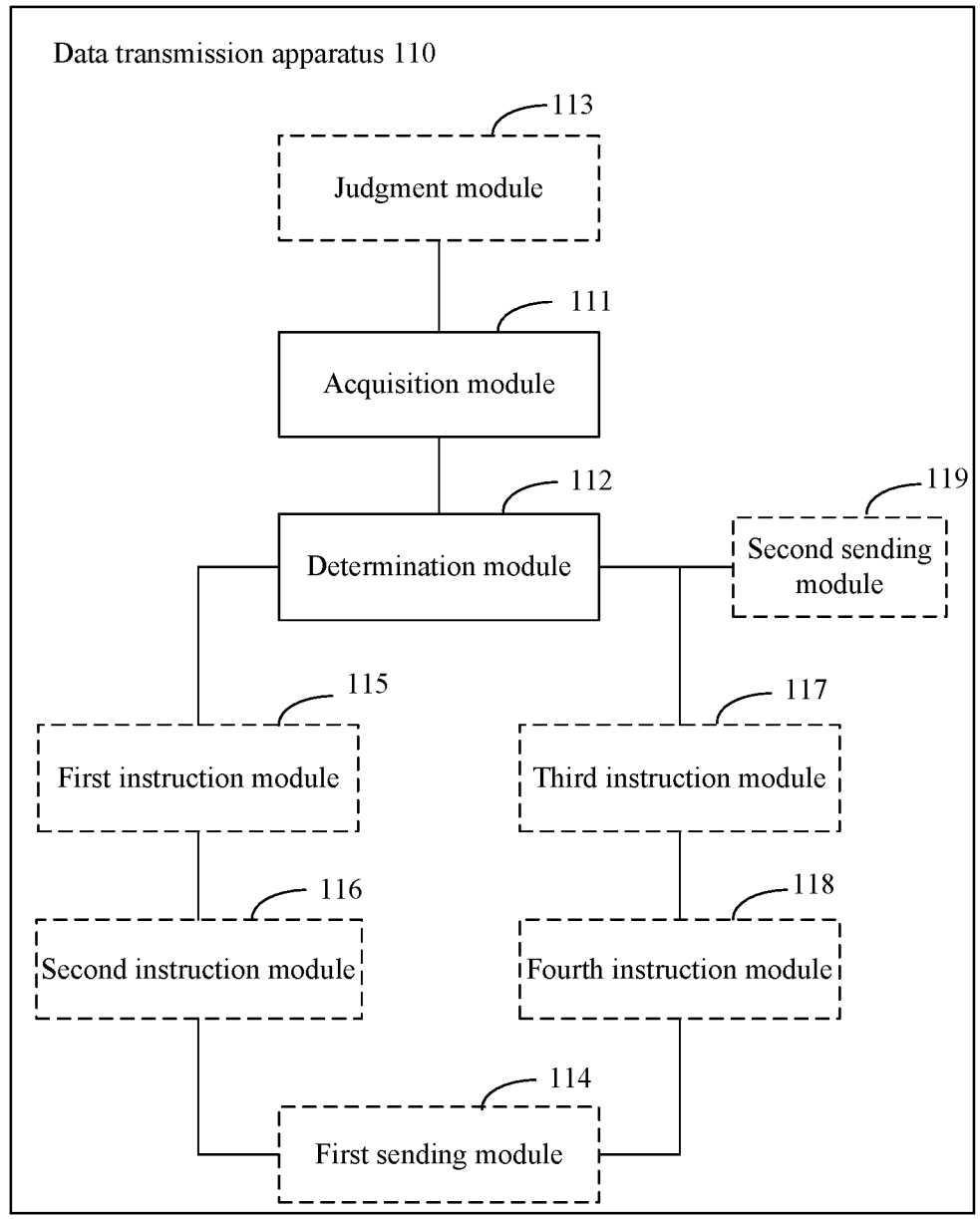
FIG. 11 is a structural diagram of an apparatus for transmitting data 110 according to a ninth embodiment of the present disclosure.

As illustrated in FIG. 11, a structural diagram of a data transmission apparatus 110 according to a ninth embodiment of the present disclosure is illustrated. The apparatus includes an acquisition module 111 and a determination module 112.

The acquisition module 111 is configured to acquire service related information of a UE.

The determination module 112 is configured to determine data transmission path information corresponding to the service related information of the UE.

In some embodiments, the data transmission path information includes at least one of service transmission scheme information or information related to a first user plane network element. The determined service transmission scheme is a user plane scheme or a control plane scheme, the user plane scheme being a scheme for transmitting service data through a user plane and an access network, and the control plane scheme being a scheme for transmitting the service data through the user plane, a control plane and the access network.

In some embodiments, the service related information may include one or more of the following information:

service flow description information, third-party identification information, service type information, traffic type information, data length information, UE type information, third-party device type information, service transmission scheme instruction information, UE location information or a third-party server location information. The service transmission scheme instruction information is used to instruct to transmit service data using a user plane scheme or a control plane scheme, the user plane scheme being a scheme for transmitting service data through a user plane and an access network, and the control plane scheme being a scheme for transmitting the service data through the user plane, a control plane and the access network.

In some embodiments, the third-party identification information includes at least one of third-party service provider identification information or identification information of sub-service provider under a third-party service provider.

The service flow description information includes at least one of an IP quintuple, a URL and a service flow identifier.

In some embodiments, the apparatus further includes a judgment module 113.

The judgment module 113 is configured to acquire, after receiving an initial attach request from the UE, subscription information or policy information of the UE from a database, judge whether to establish a data connection for the UE based on the subscription information or policy information of the UE, or judge whether to establish a data connection for the UE according to an instruction in an initial attach request initiated by the UE.

In some embodiments, the apparatus 110 is any one of the following network elements:

a third-party server; a capability open platform; a Domain Name System (DNS); a database; an independent network element having a path selection function at a network side; a control plane network element; a second control plane functional entity; a second user plane network element; or an access network element. The control plane has a first control plane functional entity and a second control plane functional entity, the first control plane functional entity is for managing the mobility context of the UE, and the second control plane functional entity is for managing the session context of the UE.

In some embodiments, the database is an HSS, or a policy database, or an independent network element having a data management function at a network side.

In some embodiments, the apparatus 110 is a control plane network element or a second control plane functional entity.

The acquisition module 111 is specifically configured to: receive data connection establishment instruction information initiated by an instruction network element, and acquire service related information of the UE according to the data connection establishment instruction information, the data connection establishment instruction information being used to instruct the apparatus 110 to determine, for the UE, data transmission path information corresponding to the service related information of the UE.

In some embodiments, the data connection establishment instruction information includes the service related information of the UE; or, the data connection establishment instruction information does not include the service related information of the UE. When the data connection establishment instruction information does not include the service related information of the UE, the acquisition module 111 is specifically configured to:

query the service related information of the UE locally or from a database, a policy server, a DNS server, a third-party server, a capability open platform or an independent network element at a network side according to the UE identification information in the data connection establishment instruction information.

In some embodiments, the instruction network element is any one of the following:

a third-party server; a capability open platform; a DNS; a database; an independent network element having a path selection function at a network side.

In some embodiments, when the instruction network element is a third-party server and the apparatus 110 is the control plane network element, the acquisition module 111 is specifically configured to: receive the data connection establishment instruction information sent by the third-party server through the capability open platform.

In some embodiments, when the apparatus 110 is the second control plane functional entity, the acquisition module 111 is specifically configured to:

receive, from the first control plane functional entity, data connection establishment instruction information sent by the instruction network element, the data connection establishment instruction information from the instruction network element carrying or not carrying the service related information of the UE; or, receive data connection establishment instruction information sent by the first control plane functional entity and service related information of the UE queried by the first control plane functional entity, the data connection establishment instruction information is sent by the instruction network element to the first control plane functional entity and not carrying the service related information of the UE.

In some embodiments, when the apparatus 110 is the control plane network element, the acquisition module 111 is specifically configured to:

receive, from the second user plane network element, data connection establishment instruction information sent by the instruction network element, the data connection establishment instruction information from the instruction network element carrying or not carrying the service related information of the UE; or, receive data connection establishment instruction information sent by the second user plane network element and service related information of the UE queried by the second user plane network element, the data connection establishment instruction information is sent by the instruction network element to the second user plane network element and not carrying the service related information of the UE.

In some embodiments, the apparatus further includes a first sending module 114.

The first sending module 114 is configured to notify the third-party server of the data transmission path information of the UE.

In some embodiments, the acquisition module 111 is specifically configured to:

receive an access request initiated by a UE, and acquire service related information of the UE based on the access request.

In some embodiments, the access request is an initial attach request or a service request.

In some embodiments, the access request carries the service related information of the UE; or, the access request does not carry the service related information of the UE.

When the access request does not carry the service related information of the UE, the acquisition module 111 is specifically configured to:

query the service related information of the UE locally or from a database, a policy server, a DNS server, a third-party server, a capability open platform or an independent network element at a network side according to UE identification information in the access request.

In some embodiments, if the apparatus 110 is the second control plane functional entity, the acquisition module 111 is specifically configured to:

receive the access request sent by the first control plane functional entity, the access request carrying or not carrying the service related information of the UE; or, receive the access request sent by the first control plane functional entity and service related information of the UE queried by the first control plane functional entity, the access request not carrying the service related information of the UE.

In some embodiments, the apparatus 110 is the control plane network element or the second control plane functional entity.

The determination module 112 is specifically configured to:

query data transmission path information corresponding to the service related information of the UE locally or from a database, a policy server, a DNS server, a third-party server, a capability open platform or an independent network element having a path selection function at a network side.

In some embodiments, the apparatus 110 is the control plane network element or the second control plane functional entity, and the determined service transmission scheme is a user plane scheme.

The apparatus further includes a first instruction module 115.

The first instruction module 115 is configured to send resource allocation instruction information to a first user plane network element in a determined data transmission path, an access network element attached by the UE, and the UE, the resource allocation instruction information being used to instruct to adopt a user plane scheme, and instruct the first user plane network element, the access network element and the UE to allocate service data transmission resources.

In some embodiments, the apparatus further includes a second instruction module 116.

The second instruction module 116 is configured to receive data disconnection instruction information sent by an instruction network element, and instruct the first user plane network element and the access network element accessed by the UE to release the service data transmission resources allocated for the UE according to the data disconnection instruction information.

In some embodiments, the apparatus 110 is the control plane network element or the second control plane functional entity, and the determined service transmission scheme is a control plane scheme.

The apparatus further includes a third instruction module 117.

The third instruction module 117 is configured to send resource allocation instruction information to a first user plane network element in a determined data transmission path, the resource allocation instruction information being used to instruct to adopt a control plane scheme to transmit service data to the UE, and instruct the first user plane network element to allocate service data transmission resources.

In some embodiments, the apparatus further includes a fourth instruction module 118.

The fourth instruction module 118 is configured to receive data disconnection instruction information sent by an instruction network element, and instruct the first user plane network element accessed by the UE to release the service data transmission resources allocated for the UE according to the data disconnection instruction information.

In some embodiments, the resource allocation instruction information further includes service flow description information, used to instruct to store a mapping relationship between the service flow description information and the allocated service data transmission resources, in order that responsive to receiving service data to be sent, a service data transmission resource corresponding to the service data to be sent is determined according to service flow description information carried in the service data to be sent.

In some embodiments, the resource allocation instruction information further includes a QoS policy, used to instruct to allocate a service data transmission resource satisfying the QoS policy.

In some embodiments, the acquisition module 111 is further configured to acquire the QoS policy according to the following operations:

querying a QoS policy corresponding to the service related information locally or from a database, a policy server, a DNS server, a third-party server, a capability open platform or an independent network element having a path selection function at a network side based on the acquired service related information.

In some embodiments, if the apparatus 110 is a third-party server, a capability open platform, a DNS, a database, or an independent network element at a network side, the apparatus further includes a second sending module 119.

The second sending module 119 is configured to send the determined data transmission path information to a control plane network element accessed by the UE or a second control plane functional entity.

In some embodiments, if the apparatus 110 is a third-party server, the second sending module 119 is specifically configured to:

send the determined data transmission path information to a control plane network element accessed by the UE through a capability open platform, or sending, through a capability open platform, the determined data transmission path information to a first control plane functional entity that sends the determined data transmission path information to a second control plane functional entity, or sending the determined data transmission path information through the capability open platform.

Tenth Embodiment

Figure 12:
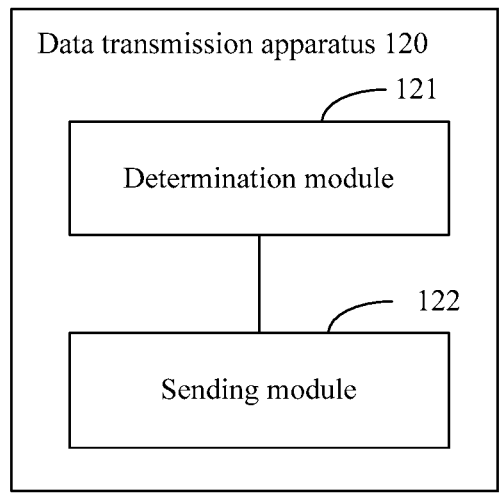
FIG. 12 is a structural diagram of an apparatus for transmitting data 120 according to a tenth embodiment of the present disclosure.

As illustrated in FIG. 12, a structural diagram of a data transmission apparatus 120 according to a tenth embodiment of the present disclosure is illustrated. The apparatus includes a determination module 121 and a sending module 122.

The determination module 121 is configured to determine data connection establishment instruction information, the data connection establishment instruction information being used to instruct a first device to determine, for a UE, data transmission path information corresponding to service related information of the UE.

The sending module 122 is configured to send the data connection establishment instruction information to the first device.

In some embodiments, if the data transmission apparatus 120 is a third-party server and the first device is a control plane network element or a second control plane functional entity, the sending module 122 is specifically configured to:

send the data connection establishment instruction information to the control plane network element through a capability open platform, or, send, through a capability open platform, the data connection establishment instruction information to a second user plane network element that sends the data connection establishment instruction information to the control plane network element; or, send, through a capability open platform, the data connection establishment instruction information to a first control plane functional entity that sends the data connection establishment instruction information to a second control plane functional entity; or, send, through a capability open platform, the data connection establishment instruction information to a second user plane network element that sends the data connection establishment instruction information to a second control plane functional entity through a first control plane functional entity.

Eleventh Embodiment

Figure 13:
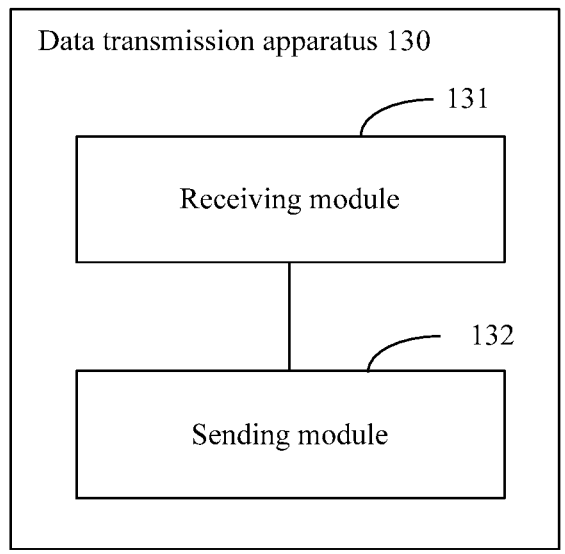
FIG. 13 is a structural diagram of an apparatus for transmitting data 130 according to an eleventh embodiment of the present disclosure.

As illustrated in FIG. 13, a structural diagram of a data transmission apparatus 130 according to an eleventh embodiment of the present disclosure is illustrated. The apparatus includes a receiving module 131 and a sending module 132.

The receiving module 131 is configured to receive data connection establishment instruction information initiated by an instruction network element.

The sending module 132 is configured to send the data connection establishment instruction information to a second control plane functional entity, so that the second control plane functional entity determines, for a UE, data transmission path information corresponding to service related information of the UE.

In some embodiments, if the data connection establishment instruction information does not include the service related information of the UE, the sending module 132 is further configured to:

query service related information of the UE based on UE identification information in the data connection establishment instruction information; and send the data connection establishment instruction information and the service related information of the UE to a second control plane functional entity.

In some embodiments, if the instruction network element is a third-party server, the receiving module 121 is specifically configured to:

receive the data connection establishment instruction information sent by the third-party server through the capability open platform.

In some embodiments, the receiving module 131 is specifically configured to: receive, from a second user plane network element, data connection establishment instruction information sent by the instruction network element.

Twelfth Embodiment

Figure 14:
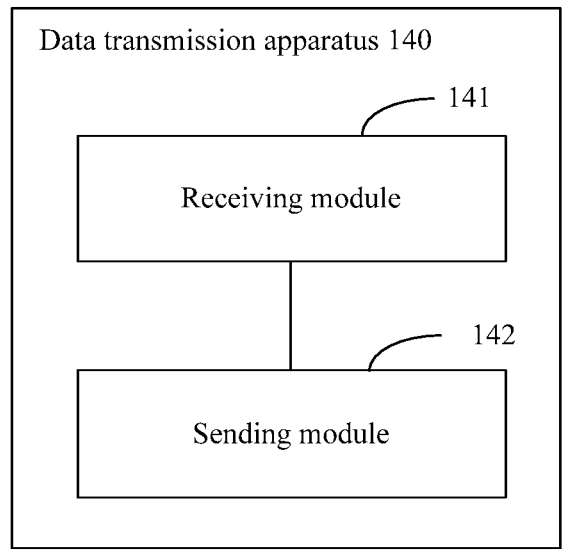
FIG. 14 is a structural diagram of an apparatus for transmitting data 140 according to a twelfth embodiment of the present disclosure.

As illustrated in FIG. 14, a structural diagram of a data transmission apparatus 140 according to a twelfth embodiment of the present disclosure is illustrated. The apparatus includes a receiving module 141 and a sending module 142.

The receiving module 141 is configured to receive data connection establishment instruction information from an instruction network element.

The sending module 142 is configured to: send the data connection establishment instruction information to a control plane network element, so that the control plane network element determines data transmission path information corresponding to service related information of a UE; or, send the data connection establishment instruction information to a first control plane functional entity that sends the data connection establishment instruction information to a second control plane functional entity, so that the second control plane functional entity determines data transmission path information corresponding to service related information of the UE.

In some embodiments, if the instruction network element is a third-party server, the receiving module 131 is specifically configured to:

receive the data connection establishment instruction information sent by the third-party server through the capability open platform.

In some embodiments, if the data connection establishment instruction information does not include the service related information of the UE, the sending module 142 is specifically configured to:

query service related information of the UE based on UE identification information in the data connection establishment instruction information; and send the data connection establishment instruction information and the service related information of the UE to a second control plane functional entity.

Thirteenth Embodiment

Figure 15:
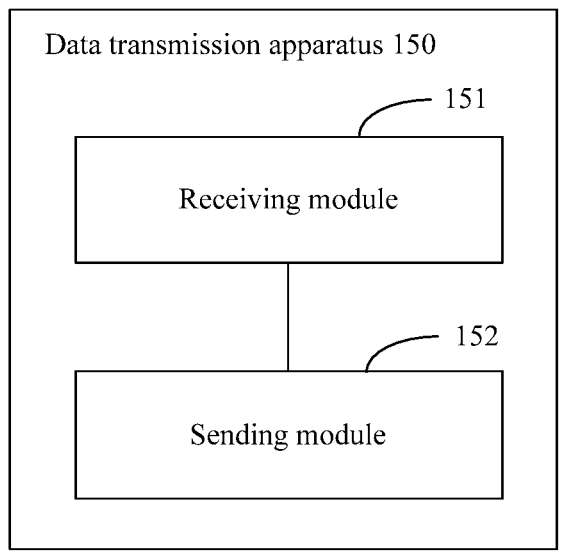
FIG. 15 is a structural diagram of an apparatus for transmitting data 150 according to a thirteenth embodiment of the present disclosure.

As illustrated in FIG. 15, a structural diagram of a data transmission apparatus 150 according to a thirteenth embodiment of the present disclosure is illustrated. The apparatus includes a receiving module 151 and a sending module 152.

The receiving module 151 is configured to receive an access request initiated by a UE.

The sending module 152 is configured to send the access request to a second control plane functional entity, so that the second control plane functional entity determines, for the UE, data transmission path information corresponding to service related information of the UE.

In some embodiments, if the access request does not carry the service related information of the UE, the sending module 152 is specifically configured to:

query service related information of the UE based on UE identification information in the access request; and send the access request and the service related information of the UE to a second control plane functional entity.

Fourteenth Embodiment

Figure 16:
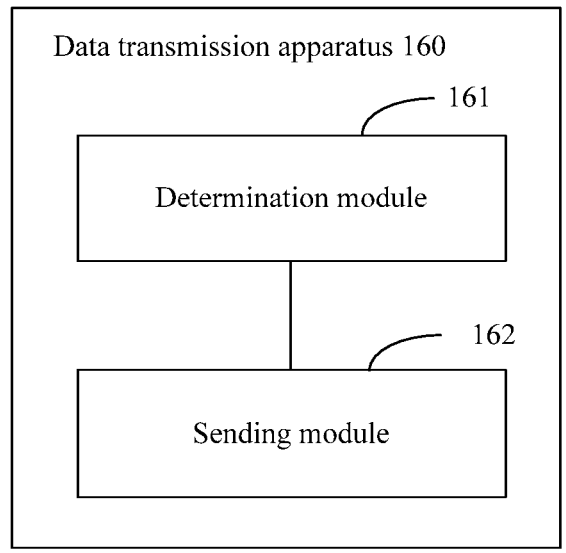
FIG. 16 is a structural diagram of an apparatus for transmitting data 160 according to a fourteenth embodiment of the present disclosure.

As illustrated in FIG. 16, a structural diagram of a data transmission apparatus 160 according to a fourteenth embodiment of the present disclosure is illustrated. The apparatus includes a determination module 161 and a sending module 162.

The determination module 161 is configured to determine an access request, the access request including at least one of UE identification information or service related information.

The sending module 162 is configured to initiate the access request to a first device, so that the first device determines, for a UE, data transmission path information corresponding to the service related information of the UE.

In some embodiments, the first device is the control plane network element or the second control plane functional entity.

If the first device is a second control plane functional entity, the sending module 152 is specifically configured to:

send the access request to a first control plane functional entity, so that the first control plane functional entity sends the access request to a second control plane functional entity.

In some embodiments, the apparatus further includes an instruction module.

The instruction module is configured to instruct, during initiation of an initial attach request, that a data connection does not need to be established.

Fifteenth Embodiment

Figure 17:
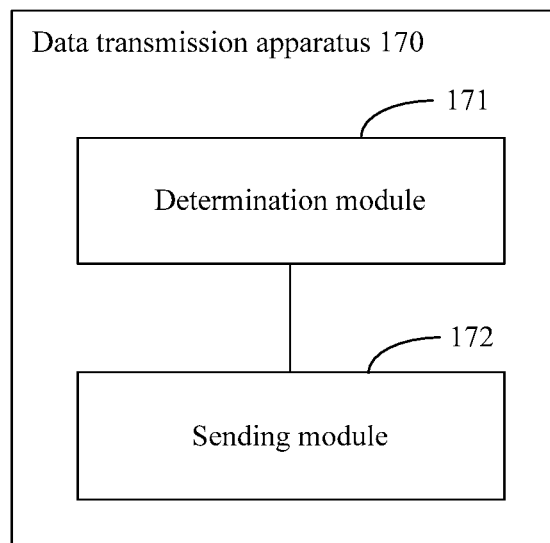
FIG. 17 is a structural diagram of an apparatus for transmitting data 170 according to a fifteenth embodiment of the present disclosure.

As illustrated in FIG. 17, a structural diagram of a data transmission apparatus 170 according to a fifteenth embodiment of the present disclosure is illustrated. The apparatus includes a determination module 171 and a sending module 172.

The determination module 171 is configured to determine registration request information, the registration request information including UE identification information and second device identification information, the second device being a control plane network element, a first control plane functional entity or a second control plane functional entity.

The sending module 172 is configured to send the registration request information to a first device, so that a first device stores a correspondence between the UE identification information and the second device identification information and establish a data connection for the UE based on the correspondence.

Sixteenth Embodiment

Figure 18:
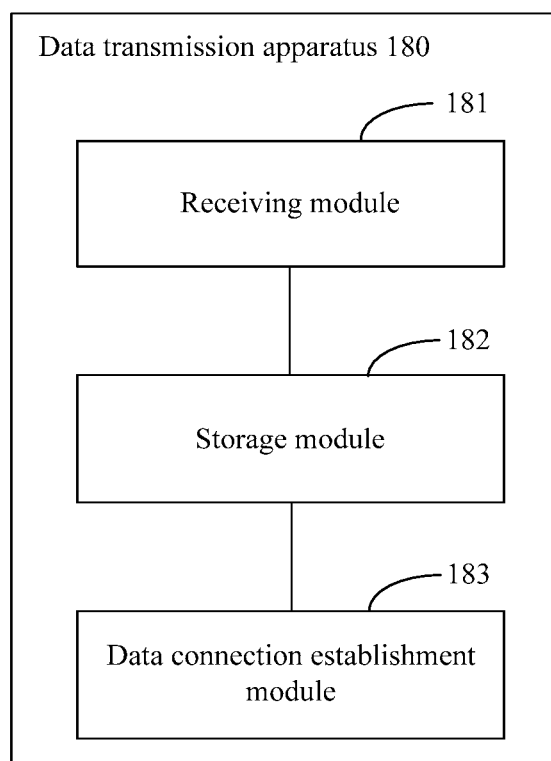
FIG. 18 is a structural diagram of an apparatus for transmitting data 180 according to a sixteenth embodiment of the present disclosure.

As illustrated in FIG. 18, a structural diagram of a data transmission apparatus 180 according to a sixteenth embodiment of the present disclosure is illustrated. The apparatus includes a receiving module 181, a storage module 182 and a data connection establishment module 183.

The receiving module 181 is configured to receive registration request information sent by a second device, the second device being a control plane network element, a first control plane functional entity or a second control plane functional entity.

The storage module 182 is configured to store a correspondence between UE identification information and second device identification information.

The data connection establishment module 183 is configured to search, when a data connection needs to be established for the UE, a second device identifier corresponding to the UE identification information, and establish a data connection for the UE based on the found second device identifier.

Further, the present disclosure may further provide an apparatus for transmitting data, including: a processor and a memory configured to store a computer program runnable on the processor.

The processor runs the computer program to perform the operations of the foregoing methods.

The present disclosure may further provide a storage medium, having a computer program stored thereon, wherein the computer program is executed by a processor to implement the operations of the foregoing methods.

A person skilled in the art should understand that the embodiments of the present disclosure may be provided as a method, a system or a computer program product. Thus, forms of complete hardware embodiments, complete software embodiments or embodiments integrating software and hardware may be adopted in the present disclosure. Moreover, a form of the computer program product implemented on one or more computer available storage media (including, but not limited to, a disk memory, a CD-ROM, an optical memory and the like) containing computer available program codes may be adopted in the present disclosure.

The present disclosure is described with reference to flowcharts and/or block diagrams of the method, the apparatus (system) and the computer program product according to the embodiments of the present disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that processing implemented by the computers is generated by executing a series of operation steps on the computers or the other programmable devices, and therefore the instructions executed on the computers or the other programmable devices provide a step of achieving the functions designated in one or more flows of the flowcharts and/or one or more blocks of the block diagrams.

While the preferred embodiment of the present disclosure has been described, those skilled in the art can make additional changes and modifications to the embodiments once knowing a basic creative concept. Therefore, the appended claims are intended to be interpreted as including the preferred embodiments and all changes and modifications falling within the scope of the present disclosure.

It will be apparent to those skilled in the art that various modifications and variations can be made in the present disclosure without departing from the spirit and scope of the present disclosure. Thus, if the modifications and variations of the present disclosure fall within the scope of the claims and equivalent technology of the present disclosure, the present disclosure is intended to cover the modifications and variations.

The invention claimed is:

1. A method for transmitting data, comprising:
acquiring, by a first device, service related information of User Equipment (UE); and
determining data transmission path information corresponding to the service related information of the UE,
wherein the service related information comprises at least one of the following:
service flow description information, third-party identification information, service type information, traffic type information, UE type information, third-party device type information, service transmission scheme instruction information, UE location information, or a third-party server location information, and
wherein the service flow description information comprises at least one of an Internet Protocol (IP) quintuple, a Uniform Resource Locator (URL), or a service flow identifier; and
wherein the third-party identification information comprises at least one of third-party service provider identification information or identification information of a sub-service provider under a third-party service provider.

2. The method according to claim 1, wherein the data transmission path information comprises at least one of service transmission scheme information or information related to a first user plane network element,
the service transmission scheme being a user plane scheme or a control plane scheme, the user plane scheme being a scheme for transmitting service data through a user plane and an access network, and the control plane scheme being a scheme for transmitting the service data through the user plane, a control plane and the access network.

3. The method according to claim 1, wherein the service transmission scheme instruction information being used for instructing to transmit service data using a user plane scheme or a control plane scheme, the user plane scheme being a scheme for transmitting the service data through a user plane and an access network, and the control plane scheme being a scheme for transmitting the service data through the user plane, a control plane and the access network.

4. The method according to claim 1, further comprising:
after receiving an initial attach request from the UE,
acquiring subscription information or policy information of the UE from a database; and judging whether to establish a data connection for the UE based on the subscription information or policy information of the UE;
or,
judging whether to establish a data connection for the UE according to an instruction in the initial attach request initiated by the UE.

5. The method according to claim 1, wherein the first device is one of the following network elements:
a third-party server, a capability open platform, a Domain Name System (DNS), a database, an independent network element having a path selection function at a network side, a control plane network element, a second control plane functional entity, a second user plane network element or an access network element,
a control plane having a first control plane functional entity and the second control plane functional entity, the first control plane functional entity managing mobility context of the UE, and the second control plane functional entity managing session context of the UE,
wherein the database comprises one of the following: a Home Subscriber Server (HSS), a policy database, or an independent network element having a data management function at the network side.

6. The method according to claim 5, wherein the first device comprises the control plane network element or the second control plane functional entity; and
acquiring, by the first device, the service related information of the UE comprises:
receiving, by the first device, data connection establishment instruction information from an instruction network element, and acquiring the service related information of the UE according to the data connection establishment instruction information,
the data connection establishment instruction information being used for instructing the first device to determine, for the UE, the data transmission path information corresponding to the service related information of the UE;
wherein the data connection establishment instruction information comprises the service related information of the UE; or, the data connection establishment instruction information does not comprise the service related information of the UE; and
the instruction network element comprises at least one of the following:
a third-party server, a capability open platform, a DNS, a database, an independent network element having a path selection function at the network side.

7. The method according to claim 6, wherein
when the data connection establishment instruction information does not comprise the service related information of the UE, acquiring, by the first device, the service related information of the UE according to the data connection establishment instruction information from the instruction network element comprises:
querying, by the first device, according to UE identification information in the data connection establishment instruction information, the service related information of the UE locally or from the database, the policy server, the DNS server, the third-party server, the capability open platform or the independent network element at the network side.

8. The method according to claim 6, wherein when the first device is the second control plane functional entity, receiving, by the second control plane functional entity, the data connection establishment instruction information from the instruction network element comprises:
receiving, by the second control plane functional entity, from the first control plane functional entity, the data connection establishment instruction information sent by the instruction network element, the data connection establishment instruction information from the instruction network element carrying or not carrying the service related information of the UE;
or,
receiving, by the second control plane functional entity, the data connection establishment instruction information sent by the first control plane functional entity and the service related information of the UE queried by the first control plane functional entity, the data connection establishment instruction information being sent by the instruction network element to the first control plane functional entity and not carrying the service related information of the UE.

9. The method according to claim 6, wherein when the first device is the control plane network element, receiving, by the first device, the data connection establishment instruction information from the instruction network element comprises:
   receiving, by the control plane network element, from the second user plane network element, the data connection establishment instruction information sent by the instruction network element, the data establishment instruction information carrying or not carrying the service related information of the UE;
   or,
   receiving, by the control plane network element, the data connection establishment instruction information sent by the second user plane network element and the service related information of the UE queried by the second user plane network element, the data connection establishment instruction information being sent by the instruction network element to the second user plane network element and not carrying the service related information of the UE.

10. The method according to claim 5, wherein the first device is the control plane network element or the second control plane functional entity;
   determining, by the first device, the data transmission path information corresponding to the service related information of the UE comprises:
      querying the data transmission path information corresponding to the service related information of the UE locally or from a database, a policy server, a DNS server, a third-party server, a capability open platform or an independent network element having a path selection function at a network side.

11. The method according to claim 5, wherein the first device is the control plane network element or the second control plane functional entity, and
   when a determined service transmission scheme is a user plane scheme, and the method further comprises:
      after determining the data transmission path information corresponding to the service related information of the UE, sending, by the first device, resource allocation instruction information to a first user plane network element in a determined data transmission path, an access network element the UE has attached, and the UE,
      the resource allocation instruction information being used to instruct to adopt the user plane scheme, and instruct the first user plane network element, the access network element and the UE to allocate service data transmission resources; or
   when a determined service transmission scheme is a control plane scheme, and the method further comprises:
      after determining the data transmission path information corresponding to the service related information of the UE, sending, by the first device, resource allocation instruction information to a first user plane network element in a determined data transmission path, the resource allocation instruction information being used to instruct to adopt the control plane scheme to transmit service data to the UE, and instruct the first user plane network element to allocate service data transmission resources.

12. The method according to claim 11, wherein the resource allocation instruction information further comprises service flow description information, and
   the resource allocation instruction information is used to instruct to store a mapping relationship between the service flow description information and the allocated service data transmission resources to determine, upon reception of service data to be sent, a service data transmission resource corresponding to the service data to be sent according to service flow description information carried in the service data to be sent.

13. The method according to claim 11, wherein the resource allocation instruction information further comprises a Service of Quality (QoS) policy, used to instruct to allocate a service data transmission resource satisfying the QoS policy,
   wherein acquiring, by the first device, the QoS policy comprises:
      querying, by the first device, based on the acquired service related information, a QoS policy corresponding to the service related information locally or from the database, a policy server, a DNS server, the third-party server, the capability open platform or the independent network element having the path selection function at the network side.

14. The method according to claim 1, wherein acquiring, by the first device, the service related information of the UE comprises:
   receiving, by the first device, an access request initiated by the UE, and acquiring the service related information of the UE based on the access request,
   wherein the access request comprises an initial attach request or a service request; and
   the access request carries the service related information of the UE; or, the access request does not carry the service related information of the UE.

15. The method according to claim 14, wherein
   when the access request does not carry the service related information of the UE, acquiring the service related information of the UE based on the access request comprises:
      querying, by the first device, according to UE identification information in the access request, the service related information of the UE locally or from a database, a policy server, a DNS server, a third-party server, a capability open platform or an independent network element at a network side.

16. The method according to claim 14, wherein when the first device is a second control plane functional entity, receiving, by the second control plane functional entity, the access request comprises:
   receiving, by the second control plane functional entity, the access request sent by a first control plane functional entity, the access request carrying or not carrying the service related information of the UE; or,
   receiving, by the second control plane functional entity, the access request sent by a first control plane functional entity and service related information of the UE queried by the first control plane functional entity, the access request not carrying the service related information of the UE.

17. The method according to claim 1, wherein the method further comprises:
   receiving, by the first device, registration request information sent by a second device, the registration request information comprising UE identification information and second device identification information, and the second device being a control plane network element, a first control plane functional entity or a second control plane functional entity;

storing a correspondence between the UE identification information and the second device identification information; and when it is determined to establish a data connection for the UE, determining the second device providing data connection service for the UE based on the correspondence.

18. The method according to claim 17, wherein when the registration request information comprises the service related information of the UE, storing the correspondence between the UE identification information and the second device identification information comprises:

storing a correspondence between the UE identification information, the service related information of the UE and the second device identification information; or, when the registration request information does not comprise the service related information of the UE and when it is determined to establish the data connection for the UE, determining the second device providing the data connection service for the UE based on the correspondence comprises:

when it is determined to establish the data connection for the UE, determining the second device providing the data connection service for the UE based on the correspondence and acquired service related information of the UE.

19. An apparatus for transmitting data, comprising: a processor and a memory configured to store a computer program runnable on the processor, wherein processor runs the computer program to perform the following operations:

acquiring service related information of User Equipment (UE); and determining data transmission path information corresponding to the service related information of the UE, wherein the service related information comprises at least one of the following:

service flow description information, third-party identification information, service type information, traffic type information, UE type information, third-party device type information, service transmission scheme instruction information, UE location information, or a third-party server location information, and wherein the service flow description information comprises at least one of an Internet Protocol (IP) quintuple, a Uniform Resource Locator (URL), or a service flow identifier, and wherein the third-party identification information comprises at least one of third-party service provider identification information or identification information of a sub-service provider under a third-party service provider.

20. A non-transitory storage medium, having a computer program stored thereon, wherein the computer program is executed by a processor to implement the following operations:

acquiring service related information of User Equipment (UE); and determining data transmission path information corresponding to the service related information of the UE, wherein the service related information comprises at least one of the following:

service flow description information, third-party identification information, service type information, traffic type information, UE type information, third-party device type information, service transmission scheme instruction information, UE location information, or a third-party server location information, and wherein the service flow description information comprises at least one of an Internet Protocol (IP) quintuple, a Uniform Resource Locator (URL), or a service flow identifier; and wherein the third-party identification information comprises at least one of third-party service provider identification information or identification information of a sub-service provider under a third-party service provider.

* * * * *